Nov. 5, 1974 K. H. WYCOFF Re. 28, 222

COMMUNICATION RECEIVER INCORPORATING TONE OPERATED PULSER CIRCUIT AND ELECTRONIC SWITCH

Original Filed Sept. 29, 1969 9 Sheets-Sheet 1

Inventor
KEITH H. WYCOFF
Pennie, Clayton, Mullin, Dithmar, & Vogel.
BY
ATTYS.

240

473
516
500
501
502
503
505
506
507
508
509
510
511
512
513
514
515
504
B+
520
521
522
523
524
525
526
527
528
530
531
532
465
540
541
542
543
545
546
547
550
551
552
610
611
612
613
570
571
572
573
574
575
576
576a
577
578
579
580
581
582
590
591
592
593
594
595
600

United States Patent Office

Re. 28,222
Reissued Nov. 5, 1974

28,222

COMMUNICATION RECEIVER INCORPORATING TONE OPERATED PULSER CIRCUIT AND ELECTRONIC SWITCH

Keith H. Wycoff, 1205 N. Tyler St., Lexington, Nebr. 68850

Original No. 3,651,413, dated Mar. 21, 1972, Ser. No. 861,719, Sept. 29, 1969. Application for reissue June 6, 1973, Ser. No. 367,580

Int. Cl. H04b *1/06*

U.S. Cl. 325—492 26 Claims

Matter enclosed in heavy brackets [ ] appears in the original patent but forms no part of this reissue specification; matter printed in italics indicates the additions made by reissue.

ABSTRACT OF THE DISCLOSURE

A communication receiver comprising a processing circuit for receiving modulated carrier signals and detecting one or more control tones therein, a pulser circuit coupled to the processing circuit and operative to produce a series of pulses for intermittently rendering the processing circuit operative, and a decoder circuit coupled to the processing circuit and responsive to the control tone or tones for generating at the output thereof a control signal, the pulser circuit being coupled to the output of the decoder circuit and responsive to the application thereto of the control signal to furnish a continuous supply voltage for the processing circuit for an interval substantially longer than the duration of each pulse in the series of pulses.

The present invention is directed to communication receivers, and particularly to a communication receiver incorporating therein a pulser circuit to maximize battery life and to provide other useful functions in the receiver.

It is an important object of the present invention to provide a communication receiver for receiving signals modulated by at least one control tone, the receiver comprising a processing circuit for receiving modulated carrier signals and detecting one or more control tones therein, a pulser circuit coupled to the processing circuit and operative to produce a series of pulses for intermittently rendering the processing circuit operative, and a decoder circuit coupled to the processing circuit and responsive to the control signal, the pulser circuit being coupled to the output of the decoder circuit and responsive to the application thereto of the control signal to furnish a continuous supply voltage for the processing circuit for an interval substantially longer than the duration of each pulse in the series of pulses.

In connection with the foregoing object, it is another object of the invention to provide a receiver comprising a switch circuit coupled to the tone decoder circuit and responsive to the control signal developed by the decoder circuit to provide an enabling signal, a utilization circuit coupled to the switch circuit and responsive to the presence of the enabling signal to provide an output signal, and an annunciator coupled to the utilization circuit for converting the output signal into usable form.

In connection with the foregoing object, it is another object of the invention to provide a communication receiver in which the utilization circuit consists of an oscillator circuit and/or an audio amplifier and the annunciator consists of a lamp and/or a loudspeaker.

Still another object of the present invention is to provide a pulsating supply voltage for intermittently operating an RF signal processing circuit, and a pulse extender to increase the length of the pulses for operation of an annunciator system.

Yet another object of the present invention is to provide a communication receiver including a pulser circuit that generates a series of pulses of one frequency in response to a set of control tones and a different frequency in response to a set of control tones having a different makeup.

A further object of the present invention is to provide a communication receiver having a pulser circuit that generates a pulsating signal for intermittently operating an alerting device such as a lamp or a loudspeaker.

A still further object of the present invention is to provide a communication receiver having a pulser circuit for producing a pulsating signal during standby and a continuous signal when audio information is being received, the audio amplifier being inoperative during standby and being rendered operative by the continuous supply voltage for amplification of the audio information.

Another object of the present invention is to maximize the useful life of a battery used in a communication receiver, while maintaining small size and light weight.

Still another object of the present invention is to provide a battery-saving circuit that is highly sensitive, highly efficient in respect to minimizing current drain, and permits high speed signaling to accommodate maximum use of the available spectrum.

Yet another object of the present invention is to provide a battery-saving circuit which will intermittently energize the receiver during standby but will continuously energize the receiver when a proper control tone or series of control tones is received, and will be affected only negligibly by control tones other than those to which the receiver is to respond.

A further object of the invention is to provide a paging system which will not only provide an audible alerting tone for the user of the pager, but will also provide a visual alerting signal to enable use of the system in noisy locations.

In connection with the foregoing object, it is a still further object to minimize drain on the battery when the visual and audible alerting signals are generated.

Further features of the invention pertain to the particular arrangement of the elements of the communication receiver, and the components and elements thereof, whereby the above-outlined and additional operating features thereof are obtained.

The invention, both as to its organization and method of operation, together with further objects and advantages thereof will best be understood by reference to the following specification taken in connection with the accompanying drawings, in which.

Figure 1:
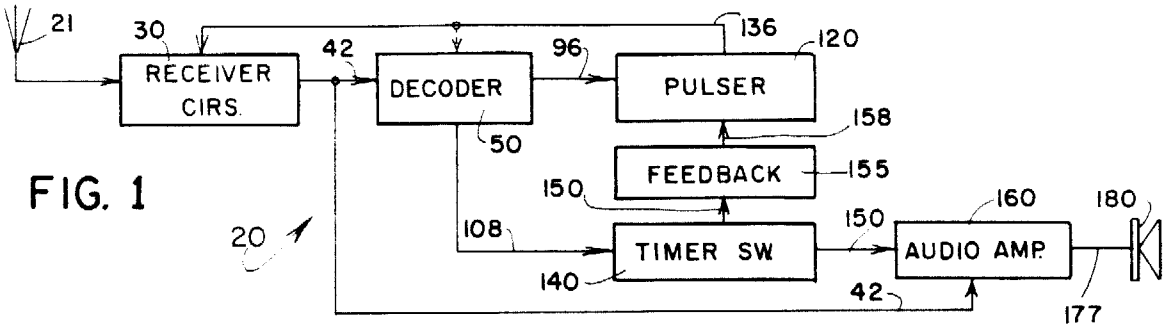
FIG. 1 is a block diagram of a communication receiver made in accordance with and embodying the principles of the present invention.

The principles of the present invention are equally applicable to communication systems utilizing lines, modulated supersonic signals, AM radio signals, and FM radio signals. For illustrative purposes, there is shown in the drawings, a communication system employing FM radio signals. Those skilled in the art will readily understand that the various principles to be described hereinafter in conjunction with the system employing FM radio signals can be readily adjusted to the other types of communications systems using other forms of transmissions such as those set forth above.

Referring now to FIG. 1 of the drawings, there is shown a communication receiver 20 made in accordance with and embodying the principles of the present invention, the receiver being generally designated by the numeral 20. The receiver 20 is adapted to receive an RF carrier modulated by audio signals and one or more control tones. The transmissions are received by the receiver 20 at the antenna 21 thereof and are coupled to receiver circuits 30 which process the modulated RF carrier and converted it into a demodulated composite signal comprised of the audio signals and the control tone. The output from the receiver circuits 30 appears on a conductor 42 which applies the audio signals to the audio amplifier 160, which in turn has its output coupled via conductor 177 to a speaker 180.

In accordance with the present invention, a decoder 50 is coupled to the conductor 42 and generates a control signal on the conductor 96 when the modulated RF carrier received by the receiver 20 includes the control tone to which the decoder 50 responds. Connected to the decoder 50 via a conductor 96 is a pulser circuit 120, the pulser circuit 120 producing on the conductor 136 a series of pulses for intermittently rendering the receiver circuits 30 (and the decoder 50, if desired) operative. In an operative embodiment, the pulses had a duration 15 milliseconds and the interval between pulses was 300 milliseconds, the receiver circuits 30 being rendered operative during the 15 millisecond duration of a pulse. If a modulated RF carrier is impressed on the antenna 21 while the receiver circuits 30 are operative, that is, during the presence of a pulse on the conductor 136, the receiver circuits 30 will become operative for a given time interval to process and detect the tones and the information and translate it to the decoder 50. If the signal contains the control tone to which the decoder 50 is tuned, a control signal will appear on the conductor 96, which energizes the pulser circuit 120 to cause it to provide a continuous supply voltage for a predetermined time. The supply voltage on the conductor 136 renders the receiver circuits 30 operative for that predetermined time. As indicated by the dashed line, the series of pulses (or continuous supply voltage, depending on which is present) may be applied to the decoder 50 to supply its power also. In the specific embodiment shown, the pulser circuit 120 is rendered operative to produce a continuous supply voltage to the receiver circuits 30 until the termination of the control tone. After that predetermined time has lapsed, the pulser circuit 120 again reverts to its quiescent operation to produce the series of pulses on the conductor 136, intermittently to render the receiver circuits 30 operative.

Also, the decoder 50 produces, on the conductor 108, a delayed control signal when the RF signal contains the control tone to which the decoder 50 is tuned. A timer switch 140, to which the conductor 108 is connected, produces an enabling signal on the conductor 150 which renders the audio amplifier 160 operative to amplify the audio signals present on the conductor 42. The audio signals are then coupled to the speaker 180 which converts them into sound waves. Since the decoder, in the embodiment shown, renders the pulser operative to provide a continuous supply voltage only for the duration of the control tone, there is provided a feedback circuit 155 connected via a conductor 150 from the timer switch 140 through a conductor 158 to the pulser circuit 120. The timer switch 140 may be set to maintain the pulser circuit 120 operative to provide a continuous supply voltage for any desired time interval even after termination of the control tone, so that the receiver circuits are operative to relay all the audio information contained in the RF signals to a utilization circuit such as the audio amplifier 160.

Figure 2:
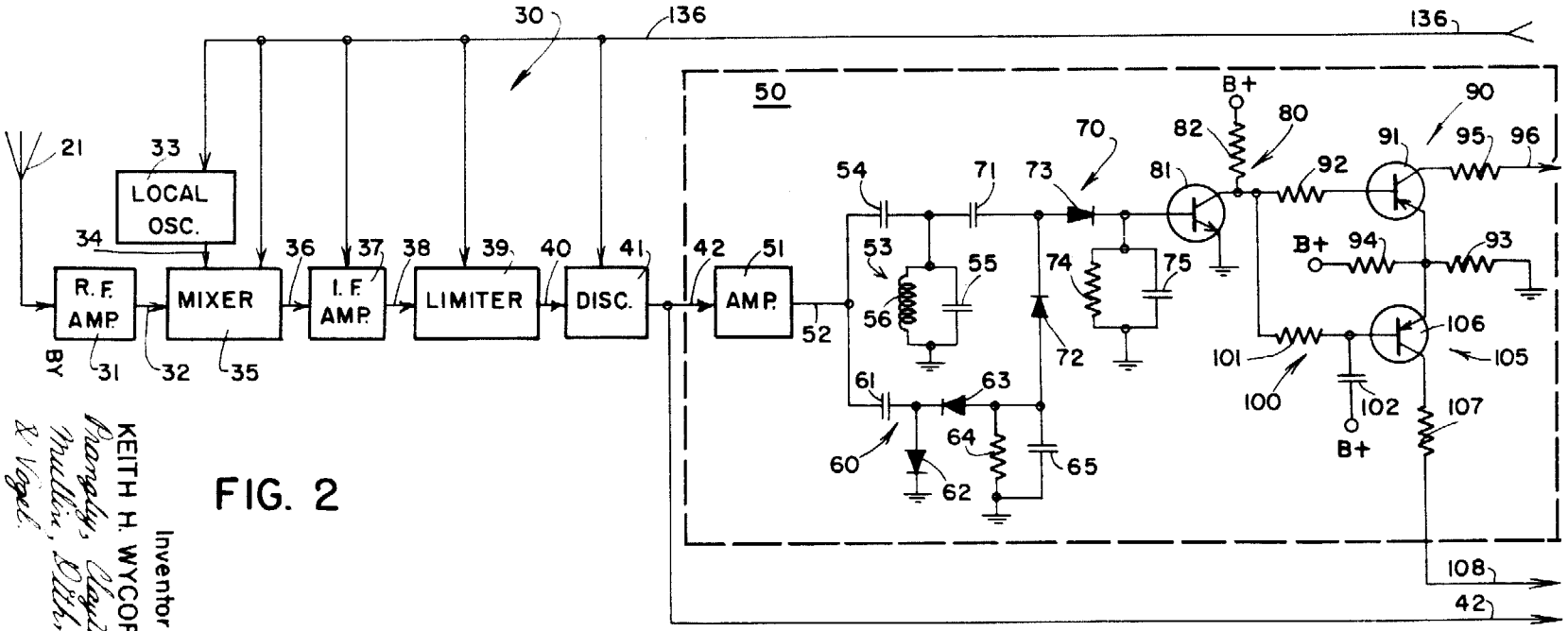
FIG. 2 is a more detailed block diagram with respect to the receiver circuits and depicts schematically the decoder for responding to a single control tone.

There is illustrated in FIG. 2 of the drawings, a more complete diagram of the communication receiver 20. The carrier signal is picked up by the antenna 21 and is conveyed to the input of a radio frequency amplifier 31. The output of the radio frequency amplifier 31 is applied by a conductor 32 as one of the inputs to the mixer 35, the usual local oscillator 33 being provided and having the output thereof connected by a conductor 34 as a second input to the mixer 35. The intermediate frequency (IF) signal which is the output of the mixer 35 is applied by a conductor 36 as the input to the IF amplifier 37, the output of which is transmitted by the conductor 38 to the input of a limiter 39. The output of the limiter 39 appears on a conductor 40 and is the input to the discriminator 41, the output of the discriminator being a composite demodulated signal appearing on the conductor 42. The composite demodulated signal includes audio signals for coupling via conductor 42 to the audio amplifier 160 (FIG. 1).

The composite demodulated signal present on the conductor 42 also includes a control tone which is applied to a decoder 50, the decoder 50 including an amplifier 51 connected to the conductor 42 and having its output coupled via a conductor 52 to a tone filter 53 by a capacitor 54, the tone filter 53 including a capacitor 55 coupled in parallel with an inductor 56. The filter 53 is coupled between ground and the junction of a capacitor 71 and the capacitor 54. The decoder 50 further comprises a reference circuit 60 including an input capacitor 61 connected to the conductor 52 and a diode 62 connected to ground. There is also provided a diode 63 connected between the junction of the capacitor 61 and the diode 62 to a filtering network comprising a resistor 64 and a capacitor 65 coupled in parallel to ground. The decoder 50 further includes a rectifying circuit having a pair of diodes 72 and 73 coupled in series from the anode of the diode 63, the capacitor 71 being coupled to the junction of the diodes 72 and 73. The rectifying circuit also includes a resistor 74 and a capacitor 75 connected in parallel from the cathode of the diode 73 to ground to provide filtering for the rectified voltage.

The amplified signal, containing the control tone and voice, on the conductor 52 will be rectified in the reference circuit 60 and will be filtered thereby to provide a reference voltage applied to the anode of the diode 72. If the signal on the conductor 52 includes the control tone to which the filter 53 is series resonant with the capacitor 54, the control tone at an increased amplitude, will appear at the cathode of the diode 72. In order to provide an output from the diode 73, the control tone appearing at the cathode of the diode 72 must have a peak-to-peak value in excess of the reference voltage on the anode of the diode 72, before the diode 72 will conduct to provide an output. In effect there is provided a filter 53 followed by a voltage doubler circuit (the tone rectifier circuit 70) which is biased in such a way that there is no DC output voltage from the diode 73 until the reference voltage on the anode of the diode 72 is exceeded. Thus, the bandwidth over which the tone produces a DC output voltage can be readily controlled by controlling the relationship between the filter output voltage and the reference voltage. With the particular filter shown, for example, the capacitor 54 may be increased in value to produce a greater tone output and consequently a wider bandwidth or lessened in value to similarly produce a narrower bandwidth.

The decoder 50 further includes an electronic switch 80 comprised of an NPN transistor 81 having its emitter grounded and its collector coupled through a resistor 82 to a supply voltage, the base being coupled to the cathode of the diode 73. There is provided a first output stage 90 consisting of a PNP transistor having its base coupled through a resistor 92 to the collector of the transistor 91.

The emitter of the transistor 91 is coupled to ground via a resistor 93 and is coupled to the source of supply voltage by a resistor 94, whereby the resistors 93 and 94 function as a voltage divider to provide a reference voltage on the emitter of the transistor 91. The collector of the transistor 91 is coupled by a resistor 95 to the first output conductor 96. There is also provided a second output stage 105 which includes a PNP transistor 106 having its base coupled by way of a resistor 101 to the collector of the transistor 81 and having its emitter coupled to the junction of the resistors 93 and 94. A capacitor 102 is coupled between the source of supply voltage and the base of the transistor 106, the resistor 101 and the capacitor 102 defining a time delay network 100 as will be explained presently. The collector of the transistor 106 is coupled by way of a resistor 107 to a second output conductor 108.

The rectified and filtered DC voltage appearing at the base of the transistor 81 in the presence of the proper control tone causes conduction of the transistor 81, thus to "switch" the collector voltage from $B^+$ to ground reference potential. This, in turn, causes the transistor 91 to conduct heavily to provide a positive DC voltage on the conductor 96, which acts as a control signal. The conduction of the transistor 81 also provides a path for current flow from $B^+$ through the capacitor 102, the resistor 101 and the collector-emitter junction of the transistor 81, thereby to charge the capacitor 102. As soon as the capacitor 102 has been sufficiently charged, the transistor 106 will begin to conduct heavily to place a positive voltage on the conductor 108, which acts as a second control signal. The charging of the capacitor 102 effectively delays the time at which the second control signal appears on the conductor 108, by an amount depending on the RC time constant of the capacitor 102 and the resistor 101. Thus, the first control signal appears on the conductor 96 as soon as the control tone is received, whereas the second control signal does not appear on the conductor 108 for some predetermined time thereafter. The purpose for the delay network 100 will be explained as the description proceeds.

Figure 3:
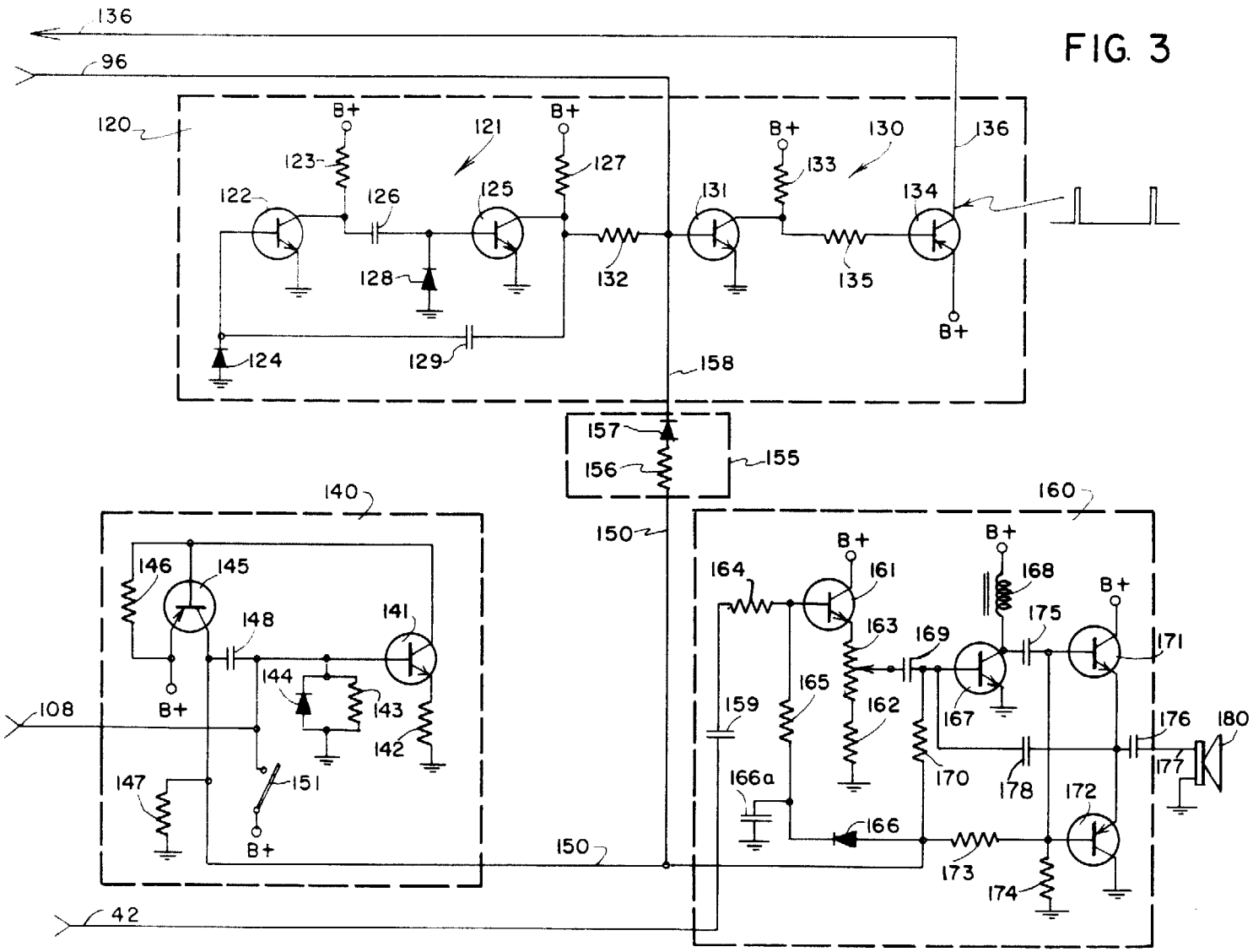
FIG. 3 is a schematic diagram of the pulser circuit, the feedback network, the timer switch and the audio amplifier in the drawing of FIG. 1.

Referring now to FIG. 3, the first control signal on the conductor 96 is applied to a pulser circuit 120 which includes an astable multivibrator 121 in which there is an NPN transistor 122 having its emitter on ground, its collector coupled through a resistor 123 to the supply voltage, and its base coupled to the cathode of a diode 124, the anode of which is on ground. The multivibrator 121 also has a second NPN transistor 125 with its emitter grounded and its base coupled through a capacitor 126 to the collector of the transistor 122. The collector of the transistor 125 is coupled to the source of supply voltage by way of a resistor 127. There is also provided a diode 128 coupled from ground to the base of the transistor 125. Last, the multivibrator 121 includes a feedback capacitor 129 coupled from the collector of the transistor 125 back to the base of the transistor 122. The diode 124 provides a fast discharge path for the capacitor 129, and the diode 128 provides a fast discharge path of the capacitor 126.

The pulser circuit 120 also includes an electronic switch 130 having an NPN transistor 131 with its emitter grounded, its base coupled to the resistor 132 and its collector coupled by way of a resistor 133 to the source of supply voltage. The switch 130 also includes a PNP transistor 134 having its emitter coupled to the source of supply voltage, its base coupled to the collector of the transistor 131 by way of a resistor 135 and its collector coupled to the output conductor 136. Also coupled to the base of the transistor 131 is the conductor 96.

In operation, the multivibrator 121 serves, by well-known operation, to produce a series of pulses having a peak-to-peak value equal to the value of the supply voltage. The duration of the pulses is determined primarily by the values of the resistor 123 and the capacitor 126; and the interval between successive pulses is determined primarily by the values of the resistor 127 and the capacitor 129. In an operating circuit incorporating the present invention, each pulse had a duration on the order of 15 milliseconds and about 300 milliseconds elapsed between successive pulses. The series of pulses is applied to the electronic switch 130, which causes successive conduction of the transistors 131 and 134 to provide a series of pulses on the conductor 136 having a peak-to-peak value equal to the value of the supply voltage. The series of pulses are translated along the conductor 136 to the various elements of the receiver circuits 30, as is most clearly shown in FIG. 2 wherein offshoots of the conductor 136 are provided for the RF amplifier 31, the local oscillator 33, the mixer 35, the IF amplifier 37, the limiter 39 and the discriminator 41. It should be clear that these pulses of supply voltage render operative each element in the receiver circuits 30 so that it is able to process RF signals appearing at the antenna 21. Of course, if an RF signal appears at the antenna 21 between pulses, the receiver circuits 30 will not be operative and that signal will not be processed.

As explained previously, if an RF signal is received at an instant when a pulse is present, the signal will be processed in the receiver circuits 30, with the audio signals being applied along the conductor 42 to the audio amplifier 160. If the composite signal on the conductor 42 contains the control tone to which the filter 53 is tuned, a first control signal will appear on the conductor 96 as previously described. The control signal on the conductor 96 is applied (FIG. 3) to the base of the first transistor 131 in the switch 130 to render the transistor 131 conductive, which in turn renders conductive the transistor 134 to place on the conductor 136 a constant DC voltage equal to the $B^+$ supply voltage, which is applied back to each element in the receiver circuits 30. Now the receiver circuits 30 are in condition to receive and process any RF signals impressed on the antenna 21 for the duration of the control signal on the conductor 96. It should be apparent that once the control signal is removed, the pulser circuit 120 reverts back to its original state and produces the series of pulses for intermittently energizing the receiver circuits 30. In the embodiment shown, the control signal on the conductor 96 terminates at the same time that the control tone ends.

However, it may be desired to maintain the receiver circuits 30 operative for a period of time after termination of the control tone. For that purpose there is provided an electronic switch circuit 140 which may either be timed to maintain the pulser circuit 120 operative to generate a continuous supply voltage for a longer duration, or may be of the latching variety in which case the pulser circuit 120 will produce a continuous supply voltage until some positive act is effected by the user to interrupt its operation. In the embodiment shown, the switch 140 is a monostable multivibrator and functions as a timer.

The electronic switch 140 includes an NPN transistor 141 having its emitter coupled to ground via a resistor 142 and having its base coupled to ground by way of a resistor 143 and a diode 144 coupled in parallel. There is also provided a PNP transistor 145 having its base connected directly to the collector of the transistor 141, its collector connected through a resistor 147 to ground and its emitter connected to a source of supply voltage, a resistor 146 being connected between the base and the emitter of the transistor 145. The collector of the transistor 145 is coupled by way of a capacitor 148 to the base of the transistor 141. A conductor 150 is coupled from the resistor 147 to a feedback network 155 consisting of a resistor 156 and a diode 157 coupled in series. The cathode of the diode 157 is coupled through a conductor 158 back to the base of the transistor 131 in the pulser circuit 120. The conductor 150 is also coupled to the audio amplifier 160. There is also provided a manually operable switch 151 coupled between the source of supply voltage and the base of the transistor 141. Finally, the conductor 108 which carries the delayed control signal from the decoder 50 is coupled to the base of the transistor 141.

In operation, the appearance of the delayed control signal on the conductor 108 causes conduction of the transistor 141 which provides a path for current flow from the source of supply voltage through the base-emitter junction of the transistor 145 and the collector-emitter junction of the transistor 141. This renders the transistor 145 highly conductive so as to provide current flow through its collector-emitter junction and the resistor 147 and thereby place the supply voltage on the conductor 150. The supply voltage becomes an enabling signal for rendering the audio amplifier 160 operative, as will be explained presently.

During the conduction periods of the transistors 141 and 145, current flows from $B^+$ through the collector-emitter junction of the transistor 145, through the capacitor 148 and through the base-emitter junction of the transistor 141 to charge the capacitor 148. Accordingly, when the control signal on the conductor 108 is removed by virtue of the control tone terminating, the transistor 141 remains conductor as the capacitor 148 continues to charge through the base-emitter junction of the transistor 141 and the resistors 142 and 143. Of course, the conduction of the transistor 141 maintains the transistor 145 conductive to maintain the enabling voltage on the conductor 150 for a time interval determined by the RC time constant of the switch circuit 140, that is, the resistors 142 and 143 and the capacitor 148. By selecting the value of those parts, the time period that the enabling signal remains on the conductor 150 may be controlled.

The audio amplifier 160 includes a first stage of amplification consisting of an NPN transistor 161 having its emitter coupled through a volume-control potentiometer 163 and a resistor 162 to ground. The collector of the transistor 161 is coupled to the source of supply voltage and its base is coupled by a resistor 164 and a capacitor 159 to the conductor 42. A bias voltage is derived by a resistor 165 and a diode 166 coupled in series from the conductor 150 to the base of the transistor 161. A capacitor 166*a* filters the DC voltage on the conductor 150. There is also provided a second stage of amplification consisting of an NPN transistor 167 having its emitter on ground, its collector coupled through a choke 168 to the source of supply voltage and its base coupled through a capacitor 169 to the movable arm of the potentiometer 163. Bias voltage for this transistor is supplied by a resistor 170 coupled between its base and the conductor 150. There is also provided a third stage of amplification consisting of a pair of complementary symmetry transistors 171 and 172, the base voltage for these transistors being supplied by a voltage divider consisting of resistors 173 and 174 connected between the conductor 150 and ground. The collector of the transistor 167 is coupled through a capacitor 175 to the connected-together bases of the transistors 171 and 172. The collectors of the transistors 171 and 172 are respectively coupled to $B^+$ and ground. The emitters of the transistors 171 and 172 are connected together and through a capacitor 176 to an annunciator such as the speaker 180. A feedback capacitor 178 reduces crossover distortion by providing negative feedback.

In operation, the enabling signal appearing on the conductor 150 in response to a control tone, is applied through the diode 166 and the resistor 165 to establish a positive voltage on the base of the transistor 161 and thereby render it conductive. The diode 166 prevents the audio signals on the conductor 42 from being applied to the electronic switch 140 by way of the conductor 150. Similarly, the enabling signal on the conductor 150 is applied through the resistor 170 to the transistor 167 to render it conductive also. Also, the enabling signal provides a bias voltage across the resistor 174 for the transistors 171 and 172. In this condition, audio signals on the conductor 42 will be amplified by the transistor 161, then by the transistor 167 and power amplified by the transistors 171 and 172. The potentionmeter 163 functions as a volume control and is accessible to the user of the receiver. Of course, without the enabling signal on the conductor 150, none of the transistors 161, 167, 171, or 172 are operative to amplify the audio signals on the conductor 42. It is thus desirable that the RC time constant in the electronic switch circuit 140 be selected to be long enough to maintain the audio amplifier 160 operative for the duration of the audio information. However, if the audio information extends beyond the time that the electronic switch 140 opens, the user can close the manual switch 151 which provides the enabling signal on the conductor 150. In the circuit shown in FIG. 3, the audio amplifier 160 may be viewed as a utilization circuit which utilizes the enabling signal appearing on the conductor 150. The speaker 180 may be viewed as an annuciator for the audio signal developed in the audio amplifier 160.

Recapitulating, the pulser circuit 120 produces a series of pulses on the conductor 136 which are used intermittently to provide supply voltage for the various elements in the receiver circuits 30. In a particular embodiment, the pulse width was 15 milliseconds and the time between pulses was 360 milliseconds, or a 4 percent duty cycle. This means that during 96 percent of the time, the communication receiver 20 was drawing essentially no current, and during the other 4 percent of the time the receiver was drawing "standby" current. In standard communication receivers, the receiver circuits are maintained continuously operative so that they provide a constant drain on the battery. Since the receiver 20 receives audio signals intended for it a fraction of 1 percent during the course of a day, the greatest drain on the battery is the amount of "standby" current drawn. It can be appreciated that in the case of the "standard" receiver, where the receiver circuits continually draw current, there is a maximum drain on the battery and a minimum useful life thereof. On the other hand, using the 4 percent duty cycle as an example, the receiver circuits 30 are drawing "standby" current only 4 percent of the time, whereby the useful life of the battery may be increased theoretically by a factor of 25. Of course the pulser circuit 120 does draw some current, so that the actual increase in battery life may be slightly less than 25 times. The circuit disclosed above means that a battery having lesser capabilities, and thus smaller size, can be used. This is most important in the particular type of receiver to which the invention is particularly adapted, namely, a portable one. To be portable, the size of the receiver must be minimized, and, since batteries always consume a substantial portion of the usable space, it is an important advantage to be able to reduce the size of the battery without sacrificing performance of the receiver. As a matter of fact, the size of the battery may be reduced and its useful life may be substantially increased at the same time by virtue of the above invention. Also, manufacturers of this type of portable equipment strive always to reduce the weight of the receiver, another objective which is accomplished by the above invention due to the smaller size of the batteries.

Figure 4:
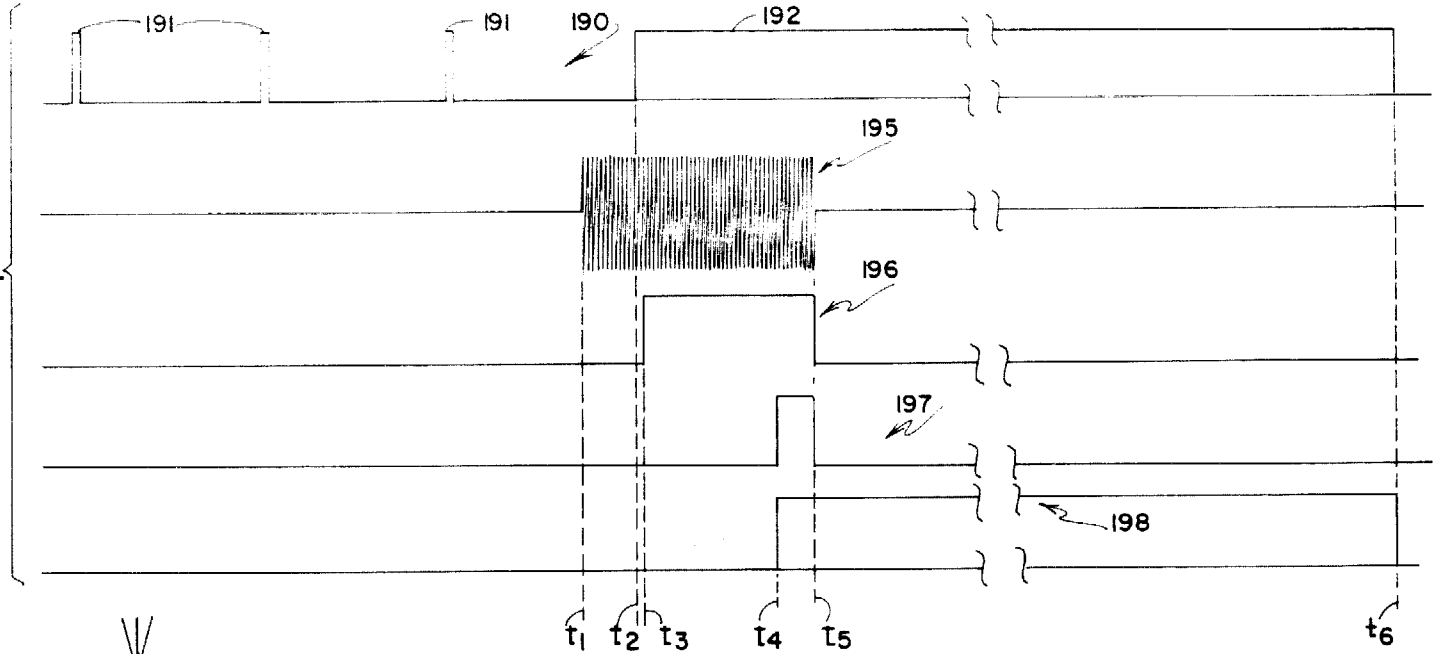
FIG. 4 is a graph showing the signals at various points in the circuitry of FIG. 3.

Reference is made to the graph of FIG. 4, wherein the waveform 190 represents the signal appearing on the conductor 136 (see FIG. 3) which is the output of the pulser circuit 120 and consists of a series of pulses 191. For purpose of illustration, the duration of each pulse is 15 milliseconds and 360 milliseconds elapses between pulses. Accordingly, the receiver circuits 30 are rendered operative for the duration of each pulse 191 and are inoperative between the pulses 191. If an RF signal carrying a control tone represented by the waveform 195 is impressed on the antenna 21 during the presence of a pulse 191, it will be detected in the discriminator 41 and will appear on the conductor 52. If the control tone has the frequency to which the filter circuit 53 is tuned, it will pass into the rectifier circuit 70. The signal on the conductor 52, including the noise thereon, is rectified by the reference circuit 60 to provide a reference voltage on the anode of the diode 72. If the signal 195 exceeds the reference voltage, it will be rectified in the rectifier circuit 70 and amplified by the transistors 81 and 91 to provide a control signal on the conductor 96. This causes the electronic switch 130 to close and provide a continuous supply voltage, which is indicated by the numeral 192 of the waveform 190. The continuous supply voltage is applied to the receiver circuits 30 to cause the control signal 196 to appear on the conductor 96. It should be noted that, although the control tone commenced at $t_1$, it would not be processed by the receiver circuits 30 since at $t_1$ the supply voltage was not being applied thereo. At $t_2$, however, a pulse 191 has commenced to render the receiver circuits 30 operative to translate the RF signal and detect the control tone 195 therein. There is a short delay of perhaps 8 milliseconds for the decoder 50 to respond so that at $t_3$ the control signal 196 commences, and terminates at $t_5$ with the termination of the control tone. Without more, the continuous supply voltage 192 would also terminate at this time. The output of the decoder 50 on the conductor 108 is shown as a waveform 197 and, as can be seen, it has the same appearance as the waveform 196, but delayed in time so that it commences at $t_4$. This is, of course, due to the delay provided by the network 100 in the decoder 50. The control signal on the conductor 108 causes the switching circuit 140 to provide on the conductor 150 an enabling signal represented by the waveform 198, commencing at $t_4$. One leg of the conductor 150 is coupled through the feed back network 155 to the electronic switch 130 in the pulser circuit 120 to maintain the switch closed and continue to provide the continuous voltage supply 192 in spite of the termination of the control tone at $t_5$. The continuous supply voltage on the conductor 136 will be present until $t_6$ which is determined by the time constant in the electronic switch circuit 140. It is, therefore, apparent that the receiver circuits 30 are operative to translate audio information via the conductor 42 to the audio amplifier 160 for the duration of $t_2$ to $t_6$. If the user finds that additional audio information is still being received, he can close the manual override switch 151 to maintain the continuous supply voltage 192 beyond $t_6$.

The conductor 150 also couples the enabling signal to the audio amplifier 160 to render the same operative to amplify the audio signals on the conductor 42. The period of conduction of the audio amplifier 160 is during the period $t_4$ to $t_6$. However if the audio information is still being received at $t_6$, the manual override switch 151 can be closed to maintain the audio amplifier 160 operative beyond $t_6$. In one embodiment of the invention, the duration of $t_4$ to $t_6$ was ten seconds, although any time shorter or longer than that is easily attained.

The delay provided by the network 100 in the decoder 50 is to minimize the possibility of the receiver responding to a false signal, particularly noise. Of course noise contains a wide spectrum of signals including the signal to which the filter circuit 53 in the decoder 50 responds. Accordingly, such a noise signal can provide a control signal on the conductor 96 to render the pulser 120 operative to produce a continuous supply voltage for the receiver circuits 30. The control tone in the noise is necessarily very short in duration so that it is unlikely that the receiver circuits will be on for more than a couple of milliseconds or so, whereby no increase in current drain occurs. Such a signal would not yield a control signal on the conductor 108 because of the delay in the network 100. Accordingly, in the presence of noise or other extraneous signals, no enabling signal is provided on the conductor 150, whereby no voltage is fed back to the pulser circuit 120 to lengthen the duration of the continuous supply voltage and whereby the audio amplifier 160 is not rendered conductive.

To insure that the control tone will operate the receiver in the manner described, the duration thereof should be longer than the lapsed time interval between successive pulses 191 by an amount at least equal to the turn on delay period $t_2$–$t_4$. So, in the example given, if the time between pulses is 360 milliseconds, then a control tone that lasts for 400 milliseconds plus the turn on delay period $t_2$–$t_4$ will necessarily be present during the occurrence of a pulse 191 and also provide for variations in the elements of the receiver.

An important feature of the invention is the fact that it responds to a control tone and will not respond to carrier signals alone. If the RF signal received by the receiver 20 does not contain a control tone at the frequency to which the filter circuit 53 is tuned, the pulser circuit 120 will not provide a continuous supply voltage, nor will the audio amplifier 160 be turned on. This is particularly important when it is considered how necessary it is today to make optimum use of the frequency spectrum. If the receiver were to be rendered operative solely by an RF signal of the proper frequency, it would be turned on many, many times during the day, even though it contained information for the user of that receiver perhaps two or three times. On the other hand, the communication receiver 20 described will draw current only during the presence of the proper carrier containing the proper control tone, thus to energize the receiver 20 only during the two or three times a day that the receiver is called.

In a typical operating example of the circuits shown in FIGS. 2 and 3, the various components thereof had the following values: capacitors 54 and 55 and the inductor 56 had values determined by the frequency to which the decoder 50 was to respond; the capacitor 61, 0.02 microfarads; the resistor 64, 1 megohm; the capacitor 65, 0.02 microfarads; the resistor 74, 5 megohms; the capacitor 75, 0.01 microfarad; the resistor 82, 1 megohm; the resistors 92 and 101, 1 megohm; the resistors 93 and 94, 100 kilohms; the resistor 95, 220 kilohms; the resistor 107, 100 kilohms; the resistor 123, 220 kilohms; the capacitor 126, 0.1 farad; the resistor 127, 220 kilohms; the capacitor 129, 0.02 farads; the resistors 132 and 133, 470 kilohms; the resistor 135, 4.7 kilohms; the resistor 146, 2.2 megohms; the resistor 147, 100 kilohms; the capacitor 148, 1.5 microfarads; the resistor 143, 2.2 megohms; the resistor [143] *142*, 22 kilohms; the resistor 156, 220 kilohms; the capacitor 159, 820 picofarads; the resistor 164, 1 megohm; the resistor 165, 220 kilohms; the capacitor [166] *166a*, 1.5 microfarads; the potentiometer 163, 0 to 10 kilohms.

Figure 5:
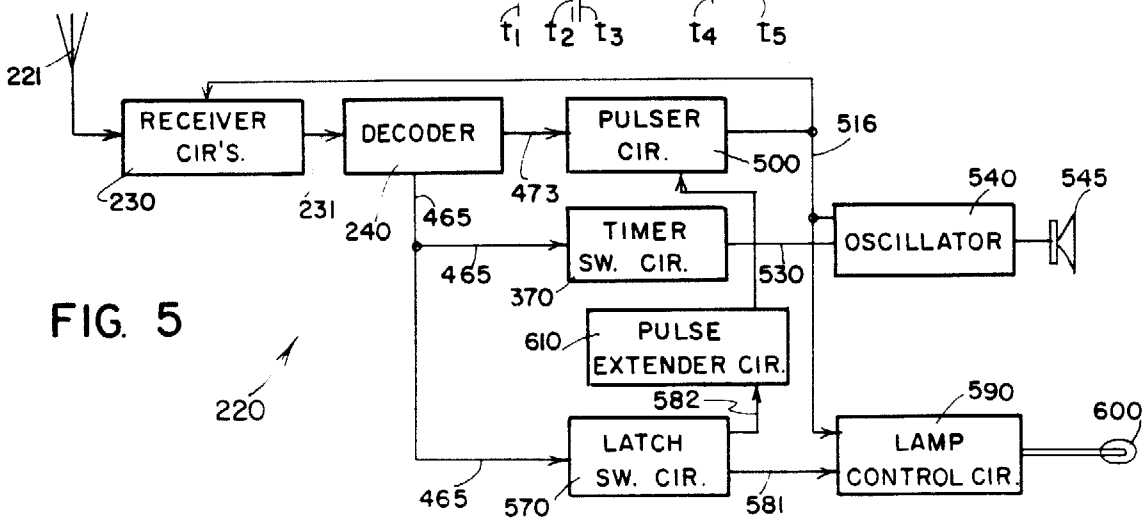
FIG. 5 is a block diagram of a second embodiment of the present invention.

Referring now to FIG. 5 of the drawings, there is illustrated a second embodiment of the present invention wherein a sequence of four tones is required to actuate the communication receiver which is designated by the numeral 220. The receiver 220 includes an antenna 221 for receiving RF signals, and receiver circuits 230 comprising the same elements as the receiver circuits 30 shown in FIG. 2. In the interest of brevity, further detailed description of the various elements of the receiver circuits 230 will be omitted. Appearing on the conductor 231, the output of the receiver circuits 230, is a composite demodulated signal including the control tones and intelligence if any. In the particular embodiment shown in FIG. 5, the communication receiver 220 has no provision for audio circuitry but rather is a paging device. Accordingly, the conductor 231 will not have any intelligence (i.e., voice) thereon. There is provided a pulser circuit 500 which is constructed and operates similarly to the pulser circuit 120 in the first embodiment. The pulser circuit 500 produces a series of pulses on the conductor 516, which is coupled back to the receiver circuits 230 to provide the supply voltage therefor. During the presence of the pulses, the receiver circuits 230 are operative to process and detect RF signals impressed on the antenna 221; whereas between successive pulses, the receiver circuits 230 are inoperative and any signals on the antenna 221 will not pass through to the decoder.

A decoder 240 is coupled to the conductor 231 and if the control tones are at the frequencies to which the decoder 240 is tuned, a control signal will be developed on the conductor 473 for application to the pulser circuit 500. The control signal on the conductor 473 commences essentially at the same time as the inception of the first control tone in the series of control tones, the control signal causing the pulser circuit 500 to furnish a continuous supply voltage for a predetermined interval on the conductor 516, which supply voltage renders the receiver circuit 230 continuously operative for that interval to process and detect RF signals on the antenna 221. Upon termination of the last control tone in the series, the control signal on the conductor [416] *516* is removed and the pulser circuit 500 again produces a series of pulses for intermittent operation of the receiver circuits 230. A second output of the decoder 240 appears on the conductor 465 and carries a second control signal that commences essentially with the reception of the last control tone in the series of control tones, assuming the previous ones have been received in the proper order. The control signal on the conductor 465 terminates with the termination of the last control tone.

The control signal on the conductor 465 is applied to a timer switch circuit 370 which, in turn, energizes a utilization circuit such as the oscillator 540. The series of pulses from the pulser circuit 500 is also applied to the oscillator 540, and, in the presence of both signals, a pulsating oscillatory signal is applied to an annunciator such as the speaker 545 which generates a series of bursts of alerting tones.

The control signal on the conductor 465 is also applied to a latching switch circuit 570 which, in turn, energizes a utilization circuit such as the lamp control circuit 590. Also applied to the lamp control circuit 590 is the series of pulses on the conductor 516. In the presence of both the series of pulses and the enabling signal from the latching switch circuit 570, an annunciator such as the lamp 600 blinks on and off at a rate determined by the series of pulses. Another output from the latch switching circuit on the conductor 582 is applied to a pulse extender circuit 610 which, upon termination of the last control tone, lengthens the pulses developed by the pulser circuit 500 to increase the duration of the bursts from the speaker 545 and to increase the on-time of the lamp 600. After expiration of a predetermined time, the timer switch circuit 370 ceases to provide the enabling signal on the conductor 530 and the bursts of audio cease. When the user operates a manual switch in the latching switch circuit 570, the lamp 600 becomes extinguished and the pulser circuit 500 reverts to producing pulses of shorter duration.

Figure 6:
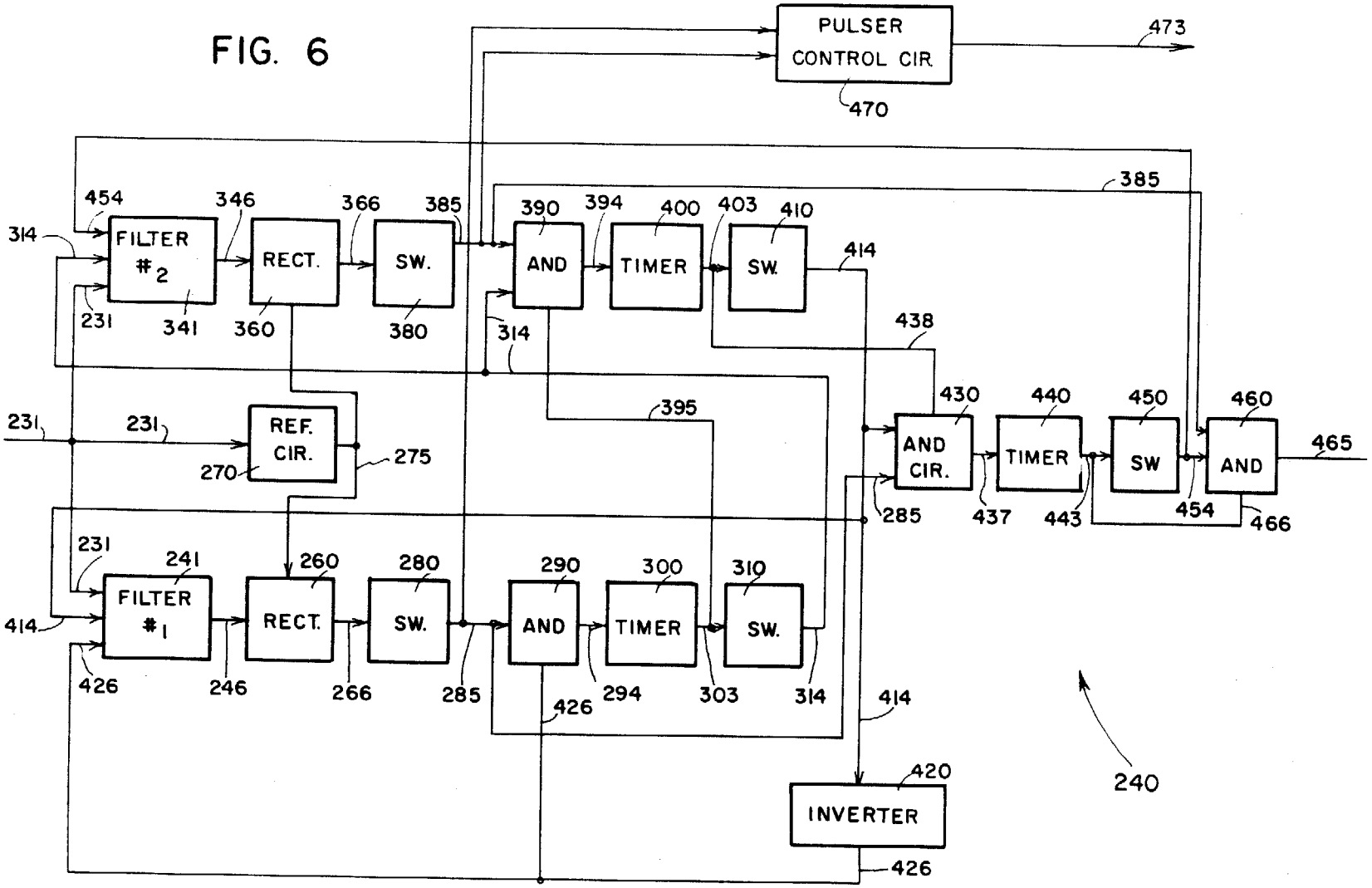
FIG. 6 is a detailed block diagram of the decoder circuit of FIG. 5.

The output from the receiver circuits on the conductor 231 is applied to the decoder 240 which is shown in block form in FIG. 6. The decoder 240 is adapted to respond to a series of four control tones received in a predetermined order. The signal on the conductor 231 is applied to a pair of tone control channels, the lower tone control channel including a special tapped filter 241 of a construction to be described hereinafter. If the filter 241 is tuned to the frequency of the first control tone on the conductor 231, it will pass to the conductor 246 and be applied to a rectifier 260. The control tones and any noise on the conductor 231 are also applied to a reference circuit 270 which provides a reference voltage on the conductor 275. If the first control tone on the conductor 246 exceeds the reference voltage on the conductor 275, the rectifier 260 will operate to rectify the first control tone and provide a filtered DC voltage on the conductor 266. The DC voltage is applied to an electronic switch 280 so as to power amplify the voltage and apply it on a conductor 285 as one input to an AND circuit 290. A second input for the AND circuit, on a conductor 426, is derived from an inverter 420. If both inputs are present, an output voltage on the conductor 294 will result, which voltage is applied to a timer 300. Upon termination of the first control tone, a DC voltage appears on the conductor 303 and persists for a duration dependent on the setting of the timer 300. The voltage on the conductor 303 is coupled to an electronic switch 310 which provides a DC voltage pulse on its output conductor 314. The voltage on the conductor 314 is coupled to a filter 341 in the second control tone channel and tunes the same to receive the second control tone present on the conductor 231. If the second control tone on the conductor 231 appears immediately and is at the frequency to which the filter 341 is now briefly tuned, it will pass to the conductor 346 and will be applied to a rectifier 360. If the second control tone on the conductor 346 exceeds the reference voltage on the conductor 275, the rectifier 360 will operate to rectify the second control tone and provide a filtered DC voltage on the conductor 366. The DC voltage is applied to an electronic switch 380 so as to power amplify the voltage and apply it on a conductor 385 as one input to an AND circuit 390. The second input for the AND circuit 390 is the voltage on the conductor 314. Thus, if the first control tone was received and has terminated so as to provide a voltage pulse on the conductor 314, and the second control tone is being received while that pulse is present to provide a DC voltage on the conductor 385, the AND circuit 390 will operate to produce a DC output voltage on the conductor 394. This voltage is applied to a timer 400 which provides a DC voltage on the conductor 403 upon termination of the first control tone, persisting for a duration dependent on the setting of the timer 400. This voltage is applied to an electronic switch 410 which produces a DC voltage on the conductor 414 for application to the inverter 420 so as to place the same in its other stable condition. The resulting output from the inverter 420 on the conductor 426 is coupled back to one input of the filter 241 which causes the filter 241 to no longer be tuned to the first control tone. Simultaneously, the voltage on the conductor 414 is applied to another input of the filter 214 to retune the same to respond to the third control tone. Finally, the voltage on the conductor 414 is applied as a first input to an AND circuit 430.

If the proper third control tone is received on the conductor 231, the filter 241 will pass the third control tone to the rectifier 260. If the third control tone exceeds the reference voltage on the conductor 275, it actuates the electronic switch 280 to provide one input to the AND circuit 290. However, the inverter is in its second stable condition so that a second input to energize the AND circuit 290 is lacking. The third control tone, in addition, provides a second input to the AND circuit 430. With both inputs to the AND circuit 430, a potential is developed on the conductor 438 which is applied back to the input of the electronic switch 410 to hold it in the active condition as long as the third tone is received. A second output of the AND circuit 430 on the conductor 437 is applied to a timer 440. Upon termination of the third control tone, a DC voltage appears on the conductor 443 and persists for a duration dependent on the setting of the timer 440. This voltage is applied to an electronic switch 450 which produces a DC voltage on the conductor 454. This output voltage is fed back to the filter 341 to retune the same so as to be operative to receive the fourth control tone. The signal on the conductor 454 is also applied as one of the inputs to an AND circuit 460.

Assuming that the proper fourth tone in the sequence of tones is now received, there will be an output from the filter 341 which will be rectified in the rectifier 360 to provide a DC voltage. This voltage operates the electronic switch 380 and provides a second input, on the conductor 385, to the AND circuit 460. In the presence of both inputs, the AND circuit 460 provides a control signal on the conductor 465. A hold-on potential is applied from the AND circuit 460 on the conductor 466 to the input of the electronic switch 450 to hold the latter in its active condition as long as the fourth tone is being received.

Also provided in the decoder 240 is a pulser control circuit 470 having a pair of inputs respectively coupled to the conductors 285 and 385. The pulser control circuit 470 is operative to provide on its output conductor 473 a control signal commencing with inception of the first control tone, it being pointed out that a voltage appears on the conductor 285 throughout the first and third tones and a voltage appears on the conductor 385 throughout the second and fourth tones, so that a voltage is continually being supplied to the pulse control circuit 470 to cause a continuous control voltage to appear on the conductor 473 for the duration of the control tones.

Figure 7:
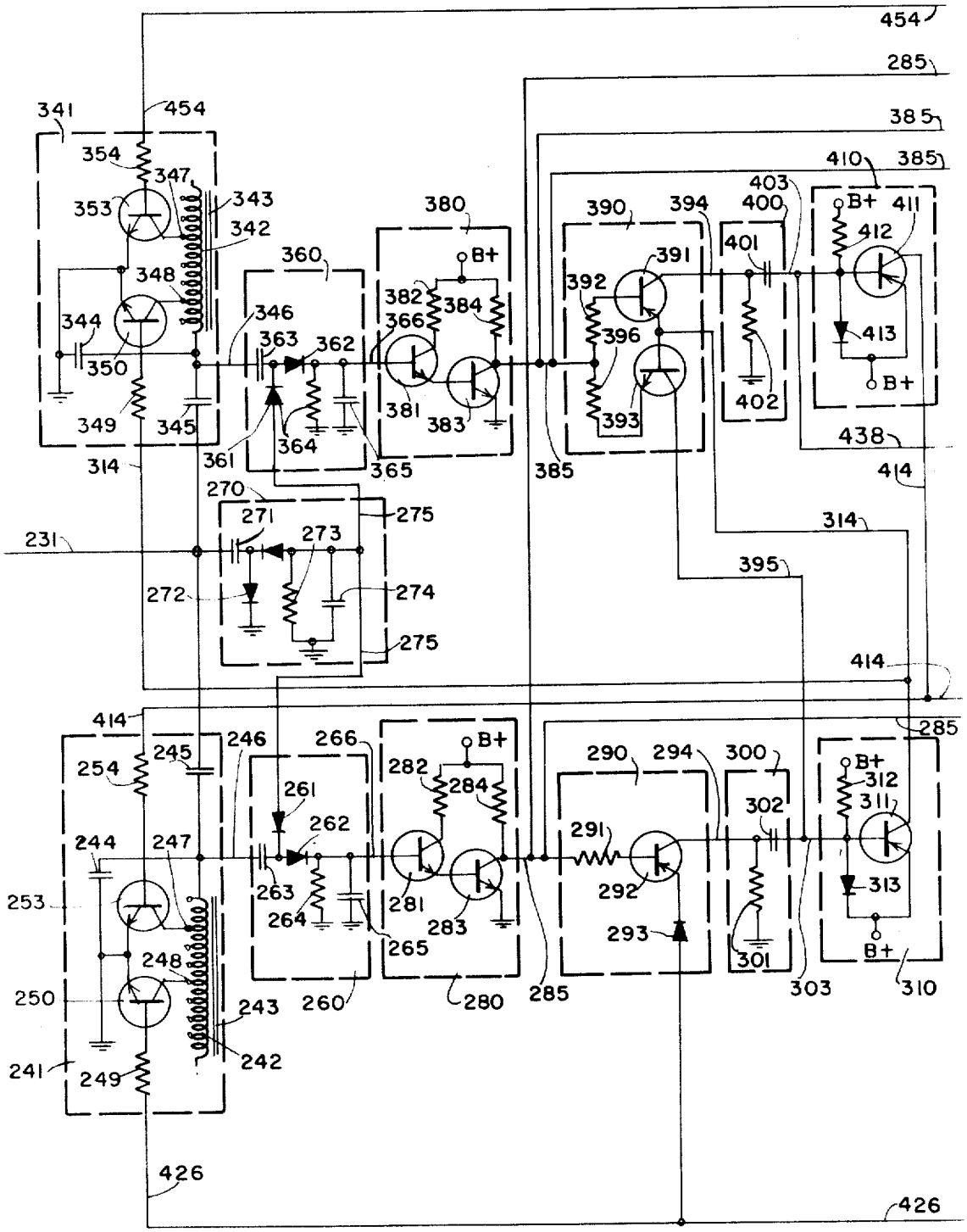
FIGS. 7, 8 and 9 are detailed schematics of the certain portions of the communication receiver of FIG. 5.
Figure 8:
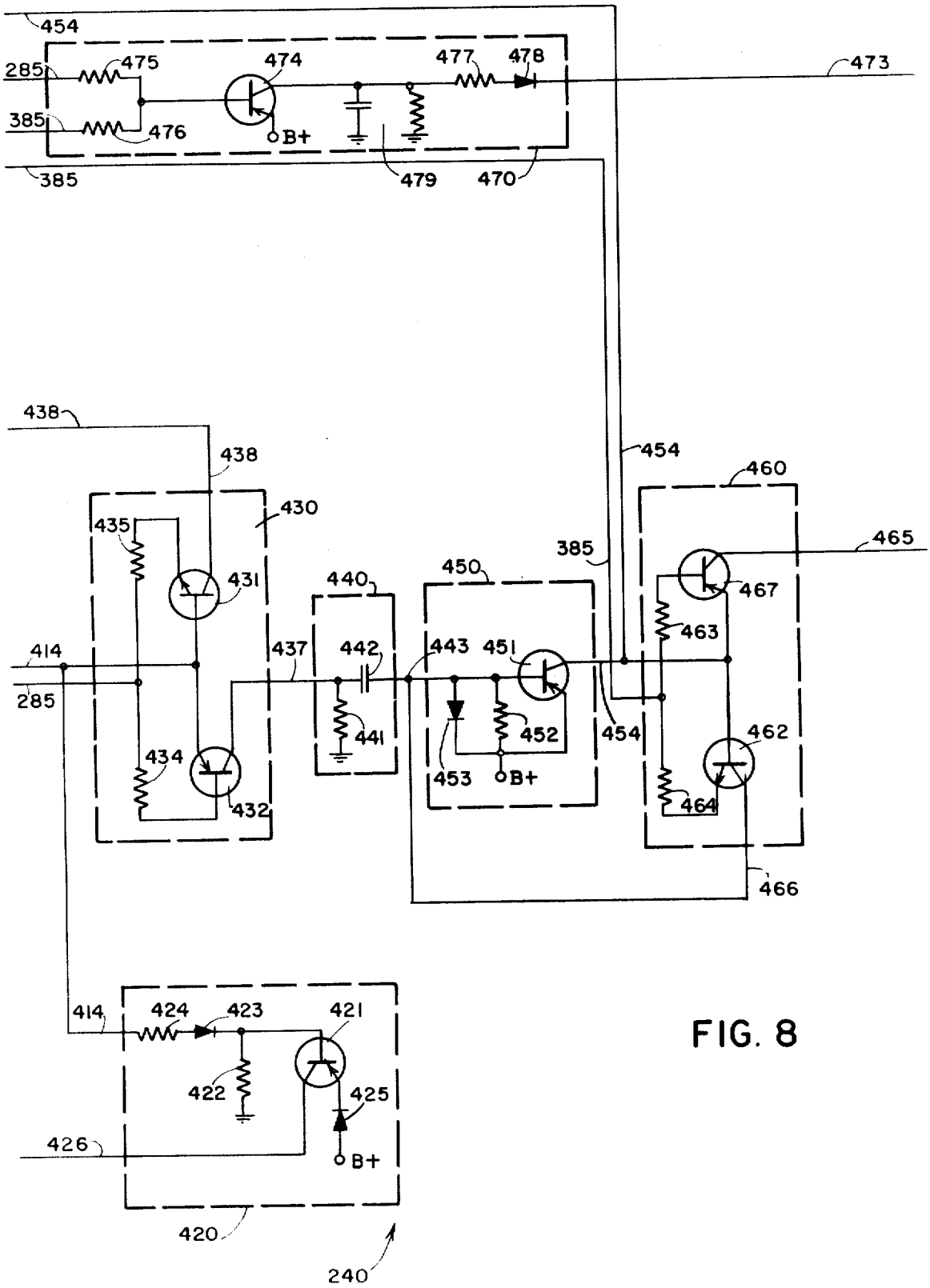

Referring now to FIGS. 7 and 8 of the drawings, there are illustrated further details of the decoder 240. The filter 241 includes an inductor 242 having associated therewith a magnetic core 243, at least a portion of the core 243 being movable and adjustable, whereby the inductor 242 can be slug tuned. The inductor 242 is connected through a capacitor 245 to the conductor 231, and a capacitor 244 is coupled from the top of the inductor 242 to ground. The ouput from the filter 241 appears on a conductor 246. The inductor 242 has a plurality of taps thereon, two of which are identified by the numerals 247 and 248. Associated with selected ones of the taps are two NPN transistors 250 and 253. A resistor 249 is coupled between the base of the transistor 250 and the conductor 426. The transistor 250 has a collector connected to the tap 248 on the inductor 242, while the emitter is connected to ground potential. A resistor 254 is coupled between the base of the transistor 253 and the conductor 414. The transistor 253 has a collector connected to the tap 247 on the inductor 242, while the emitter is connected to ground potential.

The decoder 240 also includes an inverter 420 including a PNP transistor 421, the base of which is coupled through a resistor 422 to ground and through a diode 423 and a resistor 424 to the conductor 414. A source of B+ supply voltage is coupled to the emitter of the transistor 421 through a diode 425. In its quiescent condition, the transistor 421 is heavily conductive so that the supply voltage appears on the conductor 426 to render the transistor 250 in the filter 241 heavily conductive, thereby effectively to ground the tap 248 on the inductor 242. In this condition, there is defined a parallel resonant circuit in the filter 241, composed of the capacitor 244 coupled across the top half of the inductor 242. If the first control tone on the conductor 231 is at the frequency to which the filter 241 is now tuned, the control tone, at an increased amplitude, will appear on the conductor 246. It should be noted that, at this time, the transistor 253 is nonconductive.

The control tone, together with the noise on the conductor 231, is applied to a reference circuit 270 which is constructed like the reference circuit 60 in the first embodiment, and, in the interest of brevity, no further explanation will be provided, except that a referenec voltage is provided on the conductor 275 proportional in amplitude to the control tones and noise on the conductor 231. The first control tone on the conductor 246 is applied to a rectifier 260 which has the same construction as the rectifier 70 in the first embodiment, and, again in the interest of brevity, no further explanation will be made, except that a DC voltage will be present on the conductor 266 if the control tone on the conductor 246 exceeds the reference voltage on the conductor 275.

The next stage is an electronic switch 280 consisting of a pair of cascaded NPN transistors 281 and 283, having their collectors coupled to a DC voltage supply respectively via resistors 282 and 284. The DC voltage on the conductor 266 will cause the transistors 281 and 283 to conduct heavily, so as effectively to ground the collector of the transistor 283.

The next stage is an AND circuit 290 including a PNP transistor 292 having a base coupled by way of a resistor 291 to the conductor 285. The emitter of the transistor 292 is coupled by way of a diode 293 to the conductor 426, and the collector is coupled to ground through a resistor 301. There are two inputs to the AND circuit 290 from the conductors 285 and 426. If the conductor 285 is effectively grounded, which occurs through the transistor 283 when the first control tone is present, and if the positive voltage appears on the conductor 426, which occurs when the inverter 420 is in its quiescent condition, the transistor 292 becomes heavily conductive to place a positive voltage on the conductor 294. A timer 300, consisting of the resistor 301 and a capacitor 302 produces a negative DC voltage on the conductor 303 upon termination of the positive voltage on the conductor 294 which occurs upon termination of the first control tone. The next stage is an electronic switch 310 which includes a PNP transistor 311 having its emitter coupled to the source of supply voltage, having its base coupled thereto through a resistor 312 and a diode 313, and having its collector coupled to the conductor 314. While the first control tone is being received, the capacitor 302 is being charged through the diode 313 and the transistor 311 is not conductive. However, upon termination of the first control tone, the capacitor 302 discharges through the resistor 301 to render the transistor 311 heavily conductive to place the supply voltage on the conductor 314. This voltage persists for a duration determined by the RC time constant of the timer 300. The positive voltage on the conductor 314 is applied as one input to the AND circuit 390 and as an input to the second filter 341.

The filter 341 includes an inductor 342 having associated therewith a magnetic core 343, at least a portion of the core 343 being movable and adjustable, whereby the inductor 342 can be slug tuned. The inductor 342 is connected through a capacitor 345 to the conductor 231, and a capacitor 344 is coupled from the bottom of the inductor 342 to ground. The output from the filter 341 appears on a conductor 346. The inductor 342 has a plurality of taps thereon, two of which are identified by the numerals 347 and 348. Associated with selected ones of the taps are two NPN transistors 350 and 353. A resistor 349 is coupled between the base of the transistor 350 and the conductor 314. The transistor 350 has a collector connected to the tap 348 on the inductor 342, while the emitter is connected to ground potential. A resistor 354 is coupled between the base of the transistor 353 and the conductor 454. The transistor 353 has a collector connected to the tap 347 on the inductor 342 while the emitter is connected to ground potential.

The positive supply voltage on the conductor 314 developed during the presence of the first control tone renders the transistor 350 in the filter 341 heavily conductive thereby effectively to ground the tap 348 on the inductor 342. In this condition, there is defined a parallel resonant circuit composed of the capacitor 344 coupled across the bottom portion of the inductor 342. If the second control tone in the series of control tones on the conductor 231 is at the frequency to which the filter 341 is then tuned, the control tone, at an increased amplitude, will appear on the conductor 346. It should be noted that at this time the transistor 353 is nonconductive.

The second control tone on the conductor 346 is applied to a rectifier 360 which is constructed like the rectifier 260. rectified DC voltage will appear on the conductor 366 if the second control tone exceeds the reference voltage on the conductor 275.

The next stage is an electronic switch 380 consisting of a pair of NPN transistors 381 and 383 coupled in cascade, and respectively having their collectors coupled to the source of supply voltage by way of resistors 382 and 384. The rectified DC voltage on the conductor 366 causes the transistors 381 and 383 to conduct heavily, thereby effectively grounding the collector of the transistor 383.

The next stage is an AND circuit 390 comprised of an PNP transistor 391 having its base coupled to the conductor 385 by the resistor 392. The collector of the transistor 391 is coupled to ground through a resistor 402. There is further provided an NPN transistor 393 having its base coupled to the emitter of the transistor 391, and its emitter coupled to the conductor 385 by a resistor 396. The junction of the base of the transistor 393 and the emitter of the transistor 391 is coupled to the conductor 314. The two inputs for the AND circuit 390 are on the conductors 385 and 314. It will be remembered, that a positive voltage appeared on the conductor 314 after termination of the first control tone, which positive voltage, in conjunction with the grounding of the conductor 385, by immediate reception of the second tone causes both transistors 391 and 393 to conduct heavily. The collector of the transistor 393 is coupled by way of a conductor 395 back to the conductor 303. The heavy conduction of the transistor 393 permits current to flow from B+ through the base-emitter junction of the transistor 311, through the collector-emitter junction of the transistor 393, and through the collector-emitter junction of the transistor 383, to maintain the transistor 311 conductive for the duration of the second control tone. As long as the transistor 311 is conductive, one input to the AND circuit 390 is provided and, as long as the second control tone is present, the second input to the AND circuit 390 is provided. Thus a DC voltage will be present on the conductor 385 for the duration of the second control tone. A second output from the AND circuit 390 on the conductor 394 is derived from the collector of the transistor 391. A timer 400, consisting of the resistor 402 and a capacitor 401 produces a negative DC voltage on the conductor 403 upon termination of the positive voltage on the conductor 394 which occurs upon termination of the second control tone. The next stage is an electronic switch 410, which includes a PNP transistor 411 having its emitter coupled to the source of supply voltage and having its base coupled to said source by way of a resistor 412 and a diode 413. While the second control tone is being received, the capacitor 401 is being rapidly charged through the diode 413 and the transistor 411 is not conductive. However, upon termination of the second control tone, the capacitor 401 discharges through the resistor 402 to render the transistor 411 heavily conductive to place the supply voltage on the conductor 414. This voltage persists for a duration determined by the RC time constant of the timer 400.

The positive voltage on the conductor 414 is coupled to the inverter circuit 420 to render the transistor 421 nonconductive, which in turn renders nonconductive the transistor 250 of the filter 241. Also, the conductor 414 applies a positive voltage to the base of the transistor 253 to render it heavily conductive, thereby effectively placing the capacitor 244 across the top portion of the coil 242. If the third control tone in the series of control tones on the conductor 231 has a frequency to which that resonant circuit is tuned, the resonant circuit will develop a voltage on the conductor 246 which will be rectified by the rectifier 260 to provide a DC voltage to operate the switch 280, the output of which is applied as one input to the AND circuit 290. Since the voltage on the conductor 426 is no longer positive, the AND circuit 290 will not operate in spite of the presence of the voltage on the conductor 285. The DC voltage is also applied to an AND circuit 430, and AND circuit 430 including an NPN transistor 431 having its base coupled to the emitter of a PNP transistor 432. The base of the transistor 432 is coupled to the conductor 285 by means of a resistor 434, and the emitter on the transistor 431 is coupled by a resistor 435 to the conductor 285. The conductor 414 is coupled to the junction of the base of the transistor 431 and the emitter of the transistor 432. The grounded condition of the conductor 285, resulting from the presence of the third control tone, and the plus voltage on the conductor 414, resulting from the cessation of the second control tone, cause the transistors 431 and 432 to conduct heavily. The collector of the transistor 431 is effectively grounded which provides a path for current flow through the base-emitter junction of the transistor 411 to cause the transistor to continue to conduct heavily despite interruption of the second control tone. Thus, the conductor 438 is a feedback path to maintain conductive the transistor 411 for the duration of the third control tone. The heavy conduction of the transistor 432 effectively places a positive voltage on the conductor 437 which is applied to a timer 440 consisting of a resistor 441 to ground and a series capacitor 442. The timer 440 produces a negative DC voltage on the conductor 443 upon termination of the positive voltage on the conductor 437 which occurs upon termination of the third control tone. The next stage is the electronic switch 450 comprised of a PNP transistor 451 having its base coupled to the conductor 443, and its emitter coupled to B+. There is also provided a resistor 452 and a diode 453 coupled in parallel between the base of the transistor 451 and the voltage supply source. While the third control tone is being received, the capacitor 442 is being rapidly charged through the diode 453 and the transistor 451 is not conductive. However, upon termination of the third control tone, the capacitor 442 discharges through the resistor 441 to render the transistor 451 heavily conductive to place the supply voltage on the conductor 454. This voltage persists for a duration determined by the RC time constant of the timer 440. The next stage is an AND circuit 460 including an NPN transistor 462 having its base coupled to the emittter of a PNP transistor 467. The base of the transistor 467 is coupled by way of a resistor 463 to the conductor 385. The base of the transistor 462 and the emitter of the transistor 467 are connected together and to the conductor 454.

When the transistor 451 conducts heavily in response to the termination of the third control tone, the supply voltage is effectively on the conductor 454 which is coupled back to the filter 341 to cause heavy conduction of the transistor 353 thus effectively to place the capacitor 344 across a different, greater portion of the inductor 342. It should be noted that the transistor 350 is now nonconductive since the transistor 311 became nonconductive upon termination of the third control tone. If the fourth control tone in the series of control tones on the conductor 231 has a frequency corresponding to the resonant frequency of the resonant circuit, it will be rectified by the rectifier 360 and switch the electronic switch 380, thereby grounding the conductor 385 which results in the grounding of the junction between the resistors 463 and 464 in the AND circuit 460. The concurrent grounding of the conductor 385 and the presence of the supply voltage on the conductor 454 cause the transistor 467 to conduct heavily and provide on its collector and thus the conductor 465, a positive control voltage substantially equal to the B+ supply voltage. Also, the heavy conduction of the transistor 462 effectively grounds its collector, and thus the conductor 466, so that the transistor 451 remains conductive until the fourth control tone terminates thereby removing the ground from 385.

The decoder 240 also includes a pulser control circuit 470 including a PNP transistor 474 having its emitter coupled to the supply voltage and its base coupled to the input conductors 285 and 385 respectively by the resistors 475 and 476. The collector of the transistor 474 is coupled through a resistor 477 and a diode 478 to the conductor 473. There is also provided an integrating network 479 connected to the collector of the transistor 474 and including a parallel resistor and capacitor arrangement. It will be remembered that the conductor 285 is effectively grounded upon inception of the first control tone and stays grounded throughout the first control tone and also throughout the third control tone. Similarly, the conductor 385 is grounded throughout the second and fourth control tones, whereby the transistor 474 is biased on from inception of the first control tone until termination of the last control tone and is effectively saturated so as to provide on the conductor 473 a second control signal equal to the supply voltage.

Accordingly, the decoder 240 provides two control signals: a first control signal on the conductor 465 that does not appear until the commencement of the fourth tone in the series of four tones to which the decoder 240 is set, and a second control signal also equal to the supply voltage, which is derived on the conductor 473, but appears concurrently with the appearance of the first control tone.

Figure 9:
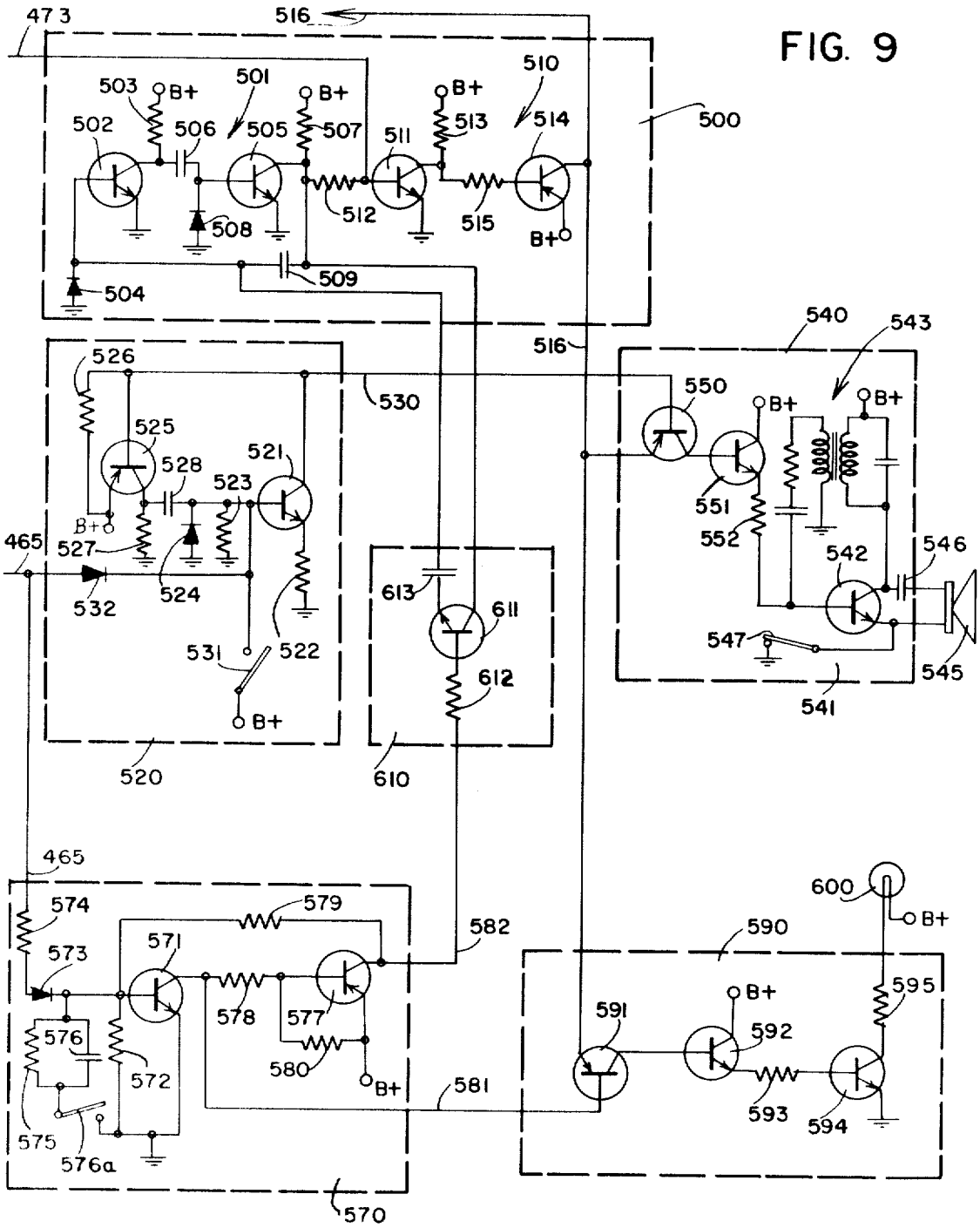

Referring now to FIG. 9, the signal on the conductor 473 is applied to a pulser circuit 500 which includes an astable multivibrator 501 in which there is an NPN transistor 502 having its emitter on ground its collector coupled through a resistor 503 to a supply voltage, and its base coupled to the cathode of a diode 504, the anode of which is on ground. The multivibrator 501 also has a second NPN transistor 505 with its emitter grounded and having its base coupled through a capacitor 506 to the collector of the transistor 502. The collector of the transistor 505 is coupled to the source of supply voltage by way of the resistor 507. There is also provided a diode 508 coupled from ground to the base of the transistor 505. Lastly, the multivibrator 501 includes a feedback capacitor 509 coupled from the collector of the transistor 505 back to the base of the transistor 502.

The pulser circuit 500 also includes an electronic switch 510 having an NPN transistor 511 with its emitter grounded and its base coupled to the resistor 512 and its collector coupled by way of a resistor 513 to the source of supply voltage. The switch 510 also includes a PNP transistor [516] *514* having its emitter coupled to the source of supply voltage, its base coupled to the collector of the transistor 511 by way of a resistor 515 and its collector coupled to the conductor 516. Also coupled to the base of the transistor 511 is the conductor 473.

In operation, the multivibrator 501 serves to produce a series of pulses having a peak-to-peak value equal to the value of the supply voltage. The duration of the pulses is determined primarily by the values of the resistor 503 and the capacitor 506, and the interval between successive pulses is determined primarily by the values of the resistor 507 and the capacitor 509. In an operating circuit incorporating the present invention, each pulse had a duration on the order of 15-milliseconds and about 360 milliseconds elapsed between successive pulses. The series of pulses is applied to the switch 510 through the transistors 511 and 514 to provide a series of pulses on the conductor 516 having a peak-to-peak value equal to the value of the supply voltage. The series of pulses are translated along the conductor 516 to the various elements of the receiver circuits 230 (see FIG 5). It should be clear that these pulses of supply voltage render operative each element in the receiver circuits 230, so that they are able to process RF signals appearing at the antenna 221. Of course, if an RF signal appears at the antenna 221 between pulses, the receiver circuits 230 will not be operative and that signal will not be processed.

If an RF signal is received at an instant when a pulse is present, the signal will be processed in the receiver circuits 230. If the composite signal on the conductor 231 contains the sequence of control tones to which the decoder 240 is tuned, a control signal will appear on the conductor 473 as previously described upon inception of the first control tone throughout the four control tones. This control signal on the conductor 473 is applied (FIG. 9) to the base of the first transistor 511 in the switch 510 to render the transistor 511 conductive, which, in turn, renders conductive the transistor 514 to place on the conductor 516 a constant DC voltage equal to the $B^+$ supply voltage, which is applied back to each element in the receiver circuits 230. Now the receiver circuits 230 are in condition to receive and process any RF signals impressed on the antenna 221 for the duration of the control signal on the conductor 473. It should be apparent that, once the control signal is removed, the pulser circuit 500 reverts back to its original state and produces the series of pulses for intermittently energizing the receiver circuits 230. In the embodiment shown, the control signal on the conductor 473 terminates at the same time that the last control tone ends.

There is also provided a switch circuit 520 which may either be timed to maintain the pulser circuit 500 operative to generate a continuous supply voltage for a longer duration, or may be of the latching variety, in which case, the pulser circuit 500 will produce a continuous supply voltage until some positive act is effected by the user to interrupt its operation. In the embodiment shown, the switch 140 is a monostable multivibrator and functions as a timer.

The switch 520 includes an NPN transistor 521 having its emitter coupled to ground via a resistor 522 and having its base coupled to ground by way of a resistor 523 and a diode 524 coupled in parallel. There is also provided a PNP transistor 525 having its base connected directly to the collector of the transistor 521, its collector connected through a resistor 527 to ground and its emitter connected to a source of supply voltage, a resistor 526 being connected between the base and the emitter of the transistor 525. The collector of the transistor 525 is coupled by way of a capacitor 528 to the base of the transistor 521. A conductor 530 is coupled to the collector of the transistor 521. The base of the transistor 521 is coupled to the conductor 465 by way of a diode 532.

In operation, the appearance of the control signal on the conductor 465 upon inception of the last control signal causes conduction of the transistor 521 which provides a path for current flow from the source of supply voltage through the base-emitter junction of the transistor 525 and the collector-emitter junction of the transistor 521. This renders the transistor 525 highly conductive so as to provide current flow through the collector-emitter junction of the transistor 525 and the resistor 527 and thereby to place an enabling signal on the conductor 530.

During the conduction periods of the transistors 521 and 525, current flows from $B^+$, through the collector-emitter junction of the transistor 525, through the capacitor 528, and through the base-emitter junction of the transistor 521 to charge the capacitor 528. Accordingly, when the control signal on the conductor 465 is removed by virtue of the last control tone terminating, the transistor 521 remains conductive because the capacitor 528 is still being charged through the base-emitter junction of the transistor 521 and the resistors 522 and 523. Of course, the conduction of the transistor 521 maintains the transistor 525 conductive to maintain the enabling voltage on the conductor 530 for a time interval determined by the RC time constant of the switch circuit 520, that is, the resistors 522 and 523 and the capacitor 528. By selecting the value of those parts, the time period that the enabling signal remains on the conductor 530 may be controlled. If desired, the switch 531 may be closed to maintain the transistors 521 and 525 conductive which causes the enabling signal to be present on the conductor 530 as long as the switch is closed. The positive voltage on the base of the transistor 521 when the time switch 520 is closed is, by virtue of the diode 532, isolated from the latching switch 570 so as to prevent undesired operation thereof.

There is also provided an oscillator circuit 540 including a free running oscillator 541. The oscillator 541 includes an NPN transistor 542 as a feedback network 543 the components of which are adjusted to cause the free running oscillator 541 to oscillate at an audio frequency, such as, for example, 1,000 hertz. A speaker 545 is coupled between the collector and emitter of the transistor 542 through a DC isolation capacitor 546, and the emitter of the transistor 542 is connected to ground through a normally closed switch 547.

There is also provided a PNP transistor 550 which functions as an AND device, its base being coupled to the conductor 530 and its emitter being coupled to the conductor 516. The collector of the transistor 550 is direct current coupled to the base of an NPN transistor 551, the emitter of which is coupled through a resistor 552 to the base of the transistor 542, and the collector of which is coupled to B+. In operation, the transistor 521 will become saturated when the four control tones have been received, thereby to ground the base of the transistor 550 through the resistor 522. The series of pulses on the conductor 516 cause the transistor 550 to be conductive for the duration of each pulse and to be nonconductive between successive pulses. The intermittent conduction of the transistor 550 causes similar intermittent conduction of the transistor 551 which in turn intermittently energizes the transistor 542. When energized, the transistor 542 is able to oscillate at the frequency determined by the feedback network 543 to form an oscillatory signal which is converted into single, spaced bursts of an altering tone by the speaker 545. Between pulses, when the transistor 542 has no base bias, the oscillator portion 541 does not oscillate and no altering tone is developed. It can be see, therefore, that the output of the speaker 545 will be a series of intermittent tones or beeps.

Of course, the pulses on the conductor 516 are continually developed as long as the receiver is on and the conductor 530 is grounded through the resistor 522 in accordance with the time constant of the timer switch 520. There is provided a switch 547 from the emitter of the transistor 542 to ground which interrupts operation of the oscillator 541. If desired, a manual switch may be provided on the conductor 530, so that the user can open the same to disable the audio channel.

Summarizing, prior to receiving the series of control tones, the pulser circuit 500 is producing a series of pulses on the conductor 516 which is applied to the receiver circuits 230 intermittently to energize them. If an RF signal is impressed on the receiver circuits 230 while they are energized, it will be processed and detected, and, if it contains the first control tone to which the decoder 240 is to respond, a first control signal will be developed on the conductor 473, causing the pulser circuit 500 to produce a continuous supply voltage for the receiver circuits 230. This control signal persists as long as the correct tones are received in the proper order. The pulses and the subsequent continual supply voltage are also, of course, coupled to the emitter of the transistor 550 in the oscillator circuit 540. However, without more, no altering tone is emitted by the speaker 545 since one of the inputs to the AND transistor 550 is not present.

If the sequence of the four control tones is that to which the decoder 240 is to respond, a second control signal will be developed on the conductor 465, commencing with the fourth tone. The second control signal operates the timer switch 520 to provide on the conductor 530 an enabling signal. This enabling signal provides the requisite second input for the AND transistor 550 and thereby renders same conductive. As previously explained, the signal on the conductor 516 is coupled to the oscillator 541 to cause same to produce a pulsating signal for the speaker 545. It can be seen that, during the last control tone when the supply voltage on the conductor 516 is continuous, the alerting tone generated by the speaker 545 would be continuous. After termination of the fourth control tone when the signal on the conductor 516 reverts to a series of pulses again, the output of the speaker 545 becomes a series of intermittent alerting tones.

There is also provided a second electronic switch 570, but instead of being of the timing variety, it is a latching switch, that is, it develops an enabling signal which will last indefinitely until interrupted. The electronic switch 570 includes an NPN transistor 571 having its emitter grounded and having its base coupled to ground through a resistor 572. The base is also coupled through a diode 573 and a resistor 574 to the conductor 465. A resistor 575 and a capacitor 576 are coupled in parallel between the base of the transistor 571 and a switch 576a. There is provided a PNP transistor 577 having its emitter coupled to the supply voltage and having its base coupled through a resistor 578 to the collector of the transistor 571. The collector of the transistor 577 is coupled back to the base of the transistor 571 through a resistor 579. In addition, there is a biasing resistor 580 between the emitter and the base of the transistor 577. The electronic switch 570 provides an enabling signal on the conductor 581, as will be explained, to operate a lamp control circuit 590.

In operation, both transistors 571 and 577 are nonconductive in the absence of the second control signal on the conductor 465. If the receiver receives a signal containing the sequence of the proper four tones, the control signal will appear on the [connector] *conductor* 465 starting with the fourth control tone. That control signal is coupled through to the transistor 571 to render same conductive which, in turn renders the transistor 577 conductive, to place a positive voltage on the collector of the transistor 577. Part of this voltage is fed back through the resistor 579 to the base of the transistor 571 in a regenerative fashion to provide [and] *an* enabling signal on the conductor 582 equal to the supply voltage, and an enabling signal on the conductor 581 essentially equal to ground reference potential. The enabling signals on the conductors 581 and 582 will persist, even though the fourth control tone has terminated and no control signal is being applied to the electronic switch 570, this being due to the regenerative switching action. To "unlatch" the electronic switch 570 and remove the enabling signals from the conductors 581 and 582, the switch **576*a* is closed momentarily grounding the feedback resistor 579. The positive voltage on the base of the transistor 571 when the latching switch 570 is "closed" is isolated from the timer switch 520 so as to prevent undesired operation thereof, by virtue of the diode 573**.

The enabling signal on the conductor 581 is applied to a lamp control circuit 590, the lamp control circuit including a PNP transistor 591 having its emitter coupled to the conductor 516, and its base coupled to the conductor 581. The collector is direct current coupled to the base of an NPN transistor 592, the collector of which is coupled to the supply voltage and the emitter of which is coupled through a resistor 593 to the base of another NPN transistor 594. The emitter of the transistor 594 is grounded and the collector is coupled through a resistor 595 to a lamp 600. Without the control signal on the conductor 465, no enabling signal appears on the conductor 581 (i.e., it is not grounded), so that the lamp control circuit 590 is not operative. However, if the proper sequence of four control tones is received, when the fourth control tone commences, a control signal will be provided on the conductor 465 which will result in an enabling signal on the conductor 581 (i.e., it is grounded) to ground the base of the transistor 591. The series of pulses on the conductor 516 will intermittently energize the transistor 591 which will, in turn, cause conduction of the transistor 592 so as to provide current flow through the collector-emitter junction thereof, through the resistor 593 and into the base-emitter junction of the transistor 594. This will cause current to flow through the lamp, the resistor 595 and the collector emitter junction of the transistor 594. The lamp 600 will be lit for a duration equal to the width of the pulse and will be extinguished between pulses. Thus, the lamp provides a blinking effect so as more easily to attract the attention of the user. The light will blink on and off indefinitely since the series of pulses on the conductor 516 occur indefinitely and since the enabling signal on the conductor 581 is latched in its grounded condition. If the user wishes to turn off the lamp, he closes the switch [576] *576a* which removes the enabling signal on the conductor 581 as previously set forth. Accordingly, the oscillator 540 may be viewed as a first oscillator for applying a first oscillator signal to the speaker 545. The pulse 500, together with the control circuit [59] *590* may be viewed as a second oscillator which, in the presence of the enabling signal on the conductor 581, will cause a second oscillator signal to be produced for energizing the lamp 600. Also, in this particular form, the oscillator circuit 540 may be viewed as a utilization circuit for the enabling signal on the conductor 530, and the lamp control circuit 590 may be viewed as a utilization circuit for the enabling signal on the conductor 581.

In order to minimize the current drain of the communication receiver 220 in its standby condition, the pulse width should be many times shorter in duration than the time between pulses. As set forth previously, in one embodiment the duration between pulses was 25 times as great as the pulse width. On the other hand, when the user is being alerted, it may be desirable to increase the duty cycle or pulse width with respect to the interval between pulses so that the alerting tone from the speaker 545 persists, and/or the lamp 600 is on, for a greater percentage of the time.

To this end, there is provided a pulse extender circut 610 having an NPN transistor 611 with its base coupled by a resistor 612 to the conductor 582. The collector of the transistor 611 is coupled to one side of the capacitor 509 in the pulser circuit 500, and the emitter of the transistor 611 is coupled through a capacitor 613 to the other side of the capacitor 509.

When the last control tone in the series of control tones begins, there is provided a positive enabling signal on the conductor 582 which causes the transistor 611 to conduct and thereby place the additional capacitance of the capacitator 613 in parallel with the capacitor 509, thereby to increase the on-time of the multivibrator circuit 501. This results in an increased duty cycle, which is reflected on the conductor 516 as pulses of increased width and decreased time between successive pulses.

Summarizing, the pulser circuit 500 produces a series of pulses on the conductor 516, which are used intermittently to provide a supply voltage for the various elements in the receiver circuits 230. In a particular embodiment, the pulse width was 15 milliseconds and the time between pulses was 360 milliseconds or a 4 percent duty cycle. This means that during 96 percent of the time the communication receiver 220 was drawing essentially no current, and that during the other 4 percent of the time the receiver was drawing "stand-by" current. Accordingly, as was the case in the first embodiment described, the useful life of the battery in the communication receiver 220 may be increased theoretically by a factor of 25. However, in the embodiment described, the pulser circuit 500 may reduce this theoretical increase by about 10 percent. Also, the lamp control circuit 590 and the oscillator circuit 540, when energized, draw additional current and contribute perhaps 5 percent additional battery drain. Finally, the first control tone, if the proper frequency, will cause the continuous supply voltage to be developed for a time sufficient to examine the second tone. If the second tone received is not the proper one, the pulser circuit reverts to producing pulses. This may contribute an additional 10 percent drain. Even with these additional losses, the useful battery life can be extended by a factor of 18, in this example, over the life of the same battery in a standard receiver. With the communication receiver 220, battery drain is minimized so as to conserve battery life, not only during standby, but also while the alerting tone is generated.

Figure 10:
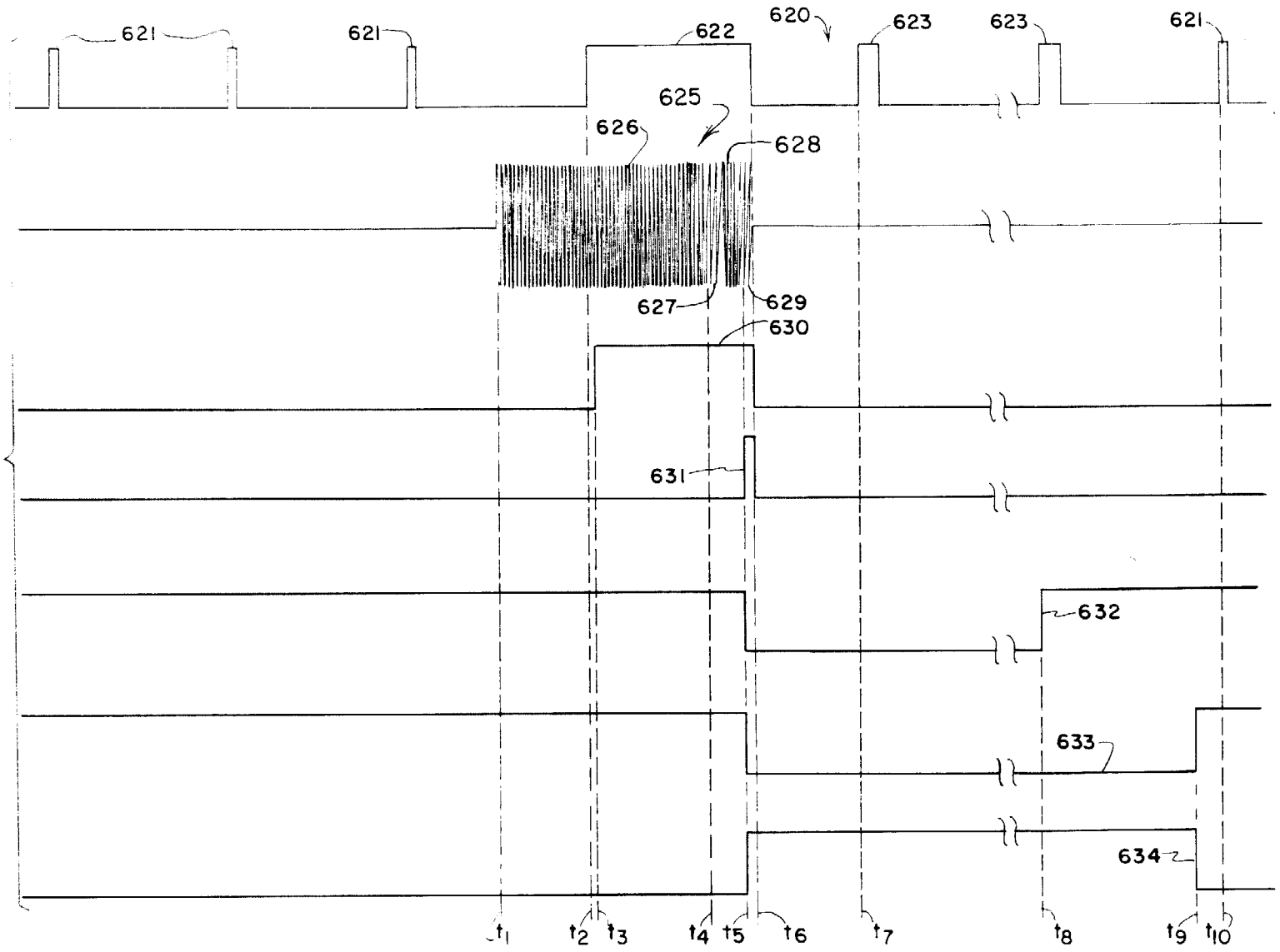
FIG. 10 is a graph depicting the signals at various points in the circuitry shown in FIG. 9.

Reference is made to the graph of FIG. 10 wherein the waveform 620 represents the signal appearing on the conductor 516 which is the output of the pulser circuit 500, and consists of a series of pulses 621. For purpose of illustration, the duration of each pulse is 15 milliseconds, and 360 milliseconds lapses between pulses. Accordingly, the receiver circuits 230 are rendered operative for the duration of each pulse 621 and are inoperative between the pulses 621. If the RF signal impressed on the antenna 221 includes one or more contol tones, they will be detected in the receiver circuits 230 and will appear on the conductor 231, if the receiver circuits are supplied with a DC voltage. The waveform 625 consists of a series of four control tones 626, 627, 628 and 629, it being assumed that these control tones, in this order, will activate the decoder 240 to produce control signals on the conductors 465 and 473. The first control tone 626 commences at $t_1$, and for purpose of illustration it is assumed that it lasts for 400 milliseconds. Further, it is assumed that, each of control tones 627, 628 and 629 lasts for 25 milliseconds, and there being substantially no time lag between successive ones of the control tones.

At $t_1$ when the control tone commences, the receiver circuits 230 are inoperative since no pulse 621 is applied thereto. The first control tone persists until $t_2$ when the next pulse 621 is generated, at which time the receiver circuits 230 become energized to process and detect the RF signal, including the first control tone 626, which is then coupled to the decoder 240. If the first control tone 626 is at the frequency to which the first filter in the decoder 240 is tuned, a control signal, represented by the waveform 630 will commence on the conductor 473, at $t_3$, which is a few milliseconds after $t_2$. This control signal is applied to the electronic switch 510 in the pulser circuit 500, causing the same to close and provide a continuous supply voltage, which is indicated by the numeral 622 on the waveform 620. The continuous supply voltage is applied to the receiver circuits 230 to permit the rest of the first control tone 626 in the RF signal to be processed by the receiver circuits 230 and to be applied to the decoder 240. When the first control tone 626 terminates at $t_4$, the control signal on the conductor 473 will persist beyond the time when the second control tone is to commence, thereby to maintain the receiver circuits 230 operative to process and detect the RF signal containing the second control tone 627, which is then coupled to the decoder 240. If the second control tone 627 is at the frequency to which the second filter in the decoder 240 is tuned, the control signal 630 on the conductor 473 will persist and maintain closed the electronic switch 510 so that it continues to provide the continuous supply voltage. The continuous supply voltage applied to the receiver circuits 230 permits the third control tone 628 in the RF signal to be processed by the receiver circuits 230 and applied to the decoder 240. When the second control tone 627 terminates, the control signal on the conductor 473 persists beyond the start of the third control tone, thereby to maintain the receiver circuits operative to process and detect the RF signal containing the third control tone which is then coupled to the decoder 240. If the third control tone [627] *628* is at the frequency to which the returned first filter in the decoder 240 is tuned, the control signal 630 will persist beyond the time when the fourth control tone is to commence, thereby to maintain the receiver circuits 230 operative to process and detect the RF signal containing the fourth control tone which is then coupled to the decoder 240. If the fourth control tone 629 is at the frequency to which the retuned second filter in the decoder 240 is tuned, the control signal on the conductor 473 will be extended to the termination of the fourth control tone at $t_6$. Accordingly, the continuous supply voltage 622 will similarly terminate at $t_6$. It should be noted, that, if after the control signal 630 is developed on the conductor 473, the correct next control tone is not received, the control signal and the continuous supply voltage 622 will terminate.

If the proper tones are received in the proper sequence, a second control signal represented by the waveform 631 will appear on the conductor 465 commencing at $t_5$, during the reception of the last control tone 629, and will terminate with the completion of the last control tone at $t_6$. The control signal 631 is applied to the timer switch 520 to cause same to produce an enabling signal represented by the waveform 632 commencing at the same time, $t_5$, as the signal 631. The enabling signal 632 lasts until $t_8$ which is determined by the RC time constant of the timer switch 520 as previously explained. The control signal 631 is also applied to the latching switch 570 to cause same to produce a second enabling signal represented by the waveform 633 commencing at the same time, $t_5$, as the signal 631. The enabling signal 633 lasts until $t_9$ which is when the user operates the reset switch 576a.

Also, the latching switch 570 produces on the conductor 582 a further enabling signal represented by the waveform 634, of a polarity opposite to the enabling signal 633, but with the same duration. The enabling signal 634 operates the pulse extender circuit 610, effectively to couple the capacitor 613 into the pulser circuit 500. This causes the duration of the pulses developed by the pulser circuit 500 to increase in duration by an amount dependent on the value of the capacitor 613. The pulses of increased duration, represented by the numeral 623 in the waveform 620, make it easier for the user to see the flashing lamp 600 and/or to hear the "beeps" from the speaker 545. These increased-duration pulses 623 occur only for the duration of the enabling signal 634. As shown in the waveform 620, at $t_{10}$, after termination of the enabling signal 634, the pulser circuit 500 again reverts to producing the narrower-duration pulses 621.

As is the case in the first embodiment described, the duration of the first control tone 626 should be longer than the lapsed time interval between successive pulses 621. So, in the example given, if the time between pulses is 360 milliseconds, a control tone that lasts for 400 milliseconds will necessarily be present during the occurrence of pulses 621, and still provide for receiver and transmitter variations. Also, as is the case in the first embodiment, the receiver 220 will not respond to carrier signals alone, but require, in addition, the presence of the proper sequence of control tones.

In FIG. 9, the lamp 600 will blink on and off and the speaker 545 will produce a series of beeps, both dependent on the frequency of the series of pulses generated by the pulser circuit 500. In certain situations, it may be desirable to have the lamp 600 and the speaker 545 produce alerting signals pulsed at one rate to page one individual and produce alerting signals of a different pulse character to page another individual or to transmit a second message. This may be accomplished by causing the series of pulses to have a given repetition rate and characteristics when a series of control tones of one character is transmitted, and to have a different repetition rate and characteristic when a series of control tones of another character is transmitted.

Figure 11:
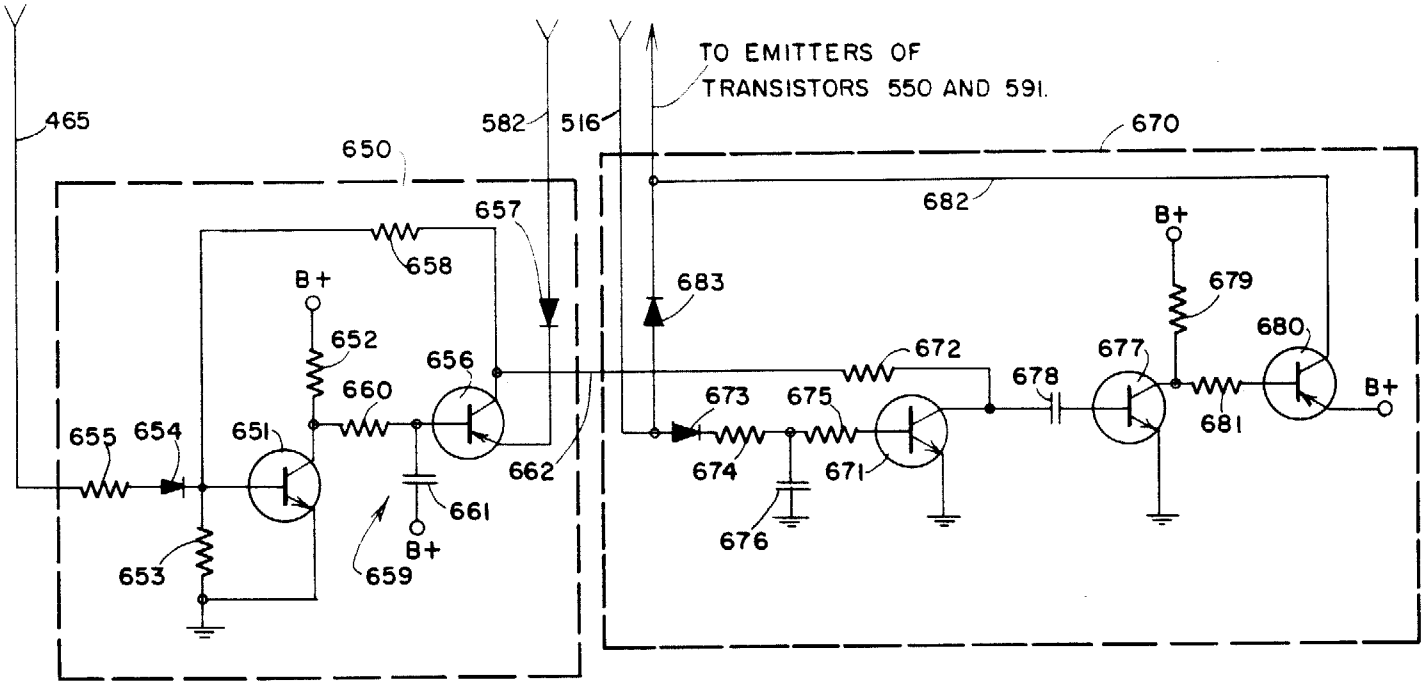
FIG. 11 shows an additional system that may be used in conjunction with the receiver of FIG. 9.

Reference is now made to FIG. 11 to describe a system that operates with the receiver 220 to achieve this change in frequency characteristic of the series of pulses. The conductor 465 is coupled to an electronic switch 650 of the latching variety, that is, it develops an enabling signal which lasts indefinitely until interrupted. The electronic switch 650 includes an NPN transistor 651 having its emitter grounded, its collector coupled through a resistor 652 to the source of supply voltage and its base coupled through a resistor 653 to ground. The base is coupled to the conductor 465 by way of a diode 654 and a resistor 655. The electronic switch 650 further includes a PNP transistor 656 having its emitter coupled to the conductor 582 by way of a diode 657, and its collector coupled to a conductor 662. The collector of the transistor 656 is coupled back to the base of the transistor 651 through a feedback resistor 658. A timing network 659 couples the collector of the transistor 651 to the base of the transistor 656, and consists of a series resistor 660 and a capacitor 661 coupled to the supply voltage.

In operation, without the control signal on the conductor 465, the transistor 651 is biased into its off condition. Also, there is no voltage applied to the emitter of the transistor 656 since no enabling signal is produced by the electronic switch 570 without the control signal on the conductor 465 applied thereto. If the proper sequence of control tones is received, an enabling signal will appear on the conductor 582, as explained previously, soon after commencement of the fourth control tone, whereby a positive voltage is applied to the emitter of the transistor 656. Simultaneously, the control signal on the conductor 465 turns on the transistor 651 to permit charging of the capacitor 661 through the resistor 660 and the collector-emitter of the transistor 651. After a predetermined time determined primarily by the value of the resistor 660 and the capacitor 661, the capacitor 661 becomes sufficiently charged to turn on the transistor 656 and thereby place a positive voltage on its collector which serves as an enabling signal on the conductor 662. A portion of the positive voltage on the collector of the transistor 656 is fed back through the resistor 658 to the base of the transistor 651 to reinforce the "on" condition thereof and thereby regeneratively "close" the electronic switch 650 and provide an enabling signal on the conductor 662. The positive voltage on the base of the transistor 651 when the electronic switch 650 is "closed," is isolated from the electronic timer switch 520 so as to prevent undesired operation thereof by virtue of the diode 654. The diode 657 provides a drop in the voltage derived from the conductor 582.

It should be noted that if the control signal on the conductor 465 does not persist long enough to permit the capacitor 661 to charge up, the transistor 656 will not be rendered conductive so that the enabling signal will not appear on the conductor 662. Thus, by transmitting a relatively short fourth control tone, the electronic switch 650 will not close, whereas transmitting a fourth control tone longer than a predetermined duration controlled by the time constant of the resistor 660 in the capacitor 661, the electronic switch 650 will close and an enabling signal on the conductor 662 will be developed.

The conductor 662 is coupled to a second pulser circuit 670, including a first NPN transistor 671 having its emitter grounded and its collector coupled to the conductor 662 by way of a resistor 672. In order to use the system of FIG. 11 with the receiver 220, the connection between the conductor 516 and the emitter of the transistor 550 in the oscillator circuit 540 is broken as is the connection between the emitter of the transistor 591 in the lamp control circuit 590. The conductor 516 is coupled through a diode 673 and a pair of resistors 674 and 675 to the base of the transistor 671, a capacitor 676 being coupled from the junction of the resistors to ground. There is also provided a transistor 677 having its emitter grounded, its base being coupled through a capacitor 678 to the collector of the transistor 671 and its collector coupled through a resistor 679 to the source of supply voltage. There is also provided a PNP transistor 680 having its base coupled through a resistor 681 to the collector of the transistor 677, and its emitter coupled to the supply voltage. The collector is coupled, by a conductor 682, to the emitters of the transistors 550 and 591. Also, a diode 683 is coupled between the conductors 516 and 682.

In operation, the pulses from the pulser circuit 500 are applied via the conductor 516 through the diode 673 and the resistors 674 and 675 to the transistor 671. If the fourth control tone in the series of control tones is not present for a sufficiently long duration, so that an enabling signal is provided on the conductor 662, no supply voltage is provided for the transistor 671 and the series of pulses is not conveyed to the succeeding stages. On the other hand, if the fourth control tone is on for longer than the predetermined duration, an enabling signal on the conductor 662 is provided to furnish supply voltage for the transistor 671. The pulses on the conductor 416 are delayed by an amount determined by the values of the capacitor 676 and the resistors 674 and 675, and are amplified in the transistor 671 and again amplified in the transistors 677 and 680 to provide on the collector of the transistor 680 a series of pulses each having essentially the same duration as the series of pulses produced by the pulser circuit 500 and being spaced in time by the same amount. However, due to the delay provided by the capacitor 676 and the resistors 674 and 675, the series of pulses on the collector of the transistor 680 is out of phase with the series of pulses on the conductor 516. The pulses on the conductor 516 are also applied to the conductor 682 through a diode 683, to combine with the out-of-phase series of pulses, thereby to generate a third series of pulses of a higher frequency than either of its two component series. The combined series consists of recurrent pairs of adjacent pulses and is applied to the emitter of the transistor 591 to cause the lamp 600 to flash in a different manner than that resulting from the series of single, spaced pulses. Similarly, the alerting tone generated by the speaker 545 will have a different characteristic. The diode 683 prevents the delayed series of pulses from being applied back to the pulser circuit 500. By properly selecting the value of the capacitor 678 and the resistor 672, the width of the delayed pulses can be changed with respect to the nondelayed pulses.

Summarizing, a series of four control tones, with the fourth control tone being relatively long, can be transmited, in which case the alerting tone is a series of "beep beeps" and the visual alerting signal is a series of spaced pairs of flashes, so that a given individual can be paged. If it is desired to page a different individual, or give the same individual a different "message," the same frequency tones can be transmitted, but a shorter fourth tone is transmitted, so that the alerting tone is a series of "beeps," and the visual alerting signal is a series of flashes.

It is to be understood that the system shown in FIGS. 9 and 11 is easily adapted to utilize a single control tone, a different plurality of control tones than four, or a plurality of simultaneously received control tones. Similarly, the first embodiment is usable, not only with a single control tone, but with a plurality of sequentially or simultaneously received control tones. Also, the various numerical examples as to values of parts and time durations, etc. were merely given for the purpose of illustration and should not in any way limit the scope of the invention described. It is contemplated that various combinations of the functions may be used, such as paging only with audio and/or visual alerting, voice only (FIG. 1), or paging plus voice.

From the above, it will be seen that there has been provided an improved communication receiver with a pulser circuit therein that operates to save battery life and provides additional useful functions.

Although there have been illustrated and described certain preferred embodiments of the invention, it is to be understood that various changes and modifications can be made therein without departing from the spirit and scope of the invention, and it is intended that all such changes and modifications be covered as fall within the scope of the appended claims.

What is claimed is:

1. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently rendering said processing circuit operative, a decoder circuit coupled to said processing circuit and having first and second outputs, said decoder circuit producing at said first output a first control signal commencing with the initiation of the control tone and producing at said second output a second control signal commencing a predetermined time after initiation of the control tone, said pulser circuit having an input coupled to the first output of said decoder circuit and responsive to the application thereto of said first control signal to furnish a continuous supply voltage for said processing circuit for an interval substantially longer than the duration of each pulse in said series of pulses, an electronic switch circuit coupled to the second output of said decoder circuit and responsive to said second control signal to provide an enabling signal, a utilization circuit having an input coupled to said switch circuit and responsive to the enabling signal to provide an output signal, and an annunciator coupled to said utilization circuit for converting the output signal into usable form.

2. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently rendering said processing circuit operative, a decoder circuit coupled to said processing circuit and responsive to the control tone for generating at the output thereof a control signal, said pulser circuit having an input coupled to the output of said decoder circuit and responsive to the application thereto of said control signal to furnish a continuous supply voltage for said processing circuit for an interval substantially longer than the duration of each pulse in said series of pulses, an electronic switch circuit coupled to the output of said decoder circuit and responsive to the control signal to provide an enabling signal, an oscillator circuit having an input coupled to said switch circuit and a second input coupled to said pulser circuit, said oscillator circuit being responsive to the concurrent presence of the enabling signal, and the series of pulses to provide an oscillatory signal during each of said pulses, and an annunciator coupled to the output of said oscillator circuit and intermittently generating an alerting signal in accordance with said oscillatory signal.

3. A communication receiver for receiving carrier signals modulated by at least one control tone and intelligence, said receiver comprising a processing circuit for receiving the modulated carrier signals and detecting the control tone and the intelligence therein, a pulser circuit coupled to said processing circuit and operative to produce a series of pulses for intermittently rendering said processing circuit operative, a decoder circuit coupled to said processing circuit and responsive to the control tone for generating at the output thereof a control signal, said pulser circuit having an input coupled to the output of said decoder circuit and responsive to the application thereto of said control signal to furnish a continuous supply voltage for an interval substantially longer than the duration of each pulse in said series of pulses, an electronic switch circuit coupled to the output of said decoder circuit and responsive to the control signal to provide an enabling signal, said electronic switch circuit including *timing* means to cause said enabling signal to persist for a *predetermined limited* duration following termination of the control tone, a feedback circuit coupled between said switch circuit and a point in the electrical path defined by said [receiver] *processing* circuit and [feed] *said* decoder circuit and said pulser circuit and responsive to said enabling signal to increase the duration of the supply voltage beyond cessation of said control tone, an audio amplifier circuit having a first input coupled to said processing circuit and a second input coupled to said switch circuit, said audio amplifier being rendered operative by said enabling signal to amplify the detected intelligence from said processing circuit, and a speaker coupled to the output of said audio amplifier circuit to convert the amplified detected intelligence into sound waves.

4. The communication receiver set forth in claim 3, wherein said feedback circuit is coupled between said electronic switch circuit and said pulser circuit.

5. The communication receiver set forth in claim 3, wherein said means including a timer to provide said enabling signal for a limited duration to render said audio amplifier operative for said limited duration, a manual override switch to provide said enabling signal after said limited duration has lapsed.

6. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently rendering said processing circuit operative, a decoder circuit coupled to said processing circuit and responsive to the control tone for generating at the output thereof a control signal, said pulser circuit having an input coupled to the output of said decoder circuit and responsive to the application thereto of said control signal to furnish a continuous supply voltage for said processing circuit for an interval substantially longer than the duration of each pulse in said series of pulses, an electronic switch circuit coupled to said decoder circuit and responsive to the control tone to provide an enabling signal, said electronic switch circuit including *timing* means to cause said enabling signal to persist for a *predetermined* duration following termination of the control tone, a feedback circuit coupled between said switch circuit and a point in the electrical path defined by said [receiver] *processing* circuit and said decoder circuit and said pulser circuit responsive to said enabling signal to increase the duration of the supply voltage beyond cessation of said control tone, a utilization circuit having an input coupled to said switch circuit and responsive to the enabling signal to provide an output signal, and an annunciator coupled to said utilization circuit for converting the output signal into usable form.

7. The communication receiver set forth in claim 6, wherein said feedback circuit is coupled between said electronic switch circuit and said pulser circuit.

8. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently rendering said processing circuit operative, a decoder circuit coupled to said processing circuit and responsive to the control tone for generating at a first output thereof a first control signal and for generating at a second output thereof a delayed second control signal, said pulser circuit having an input coupled to said first output of said decoder circuit and responsive to the application thereto of said first control signal to furnish a continuous supply voltage for said processing circuit for an interval substantially longer than the duration of each pulse in said series of pulses, a first electronics switch circuit coupled to said second output of said decoder circuit and responsive to said second control signal to provide a first enabling signal, a first oscillator circuit coupled to said first electronic switch circuit and responsive to the presence of the first enabling signal to provide a first oscillatory signal, a speaker coupled to the output of said first oscillator circuit for intermittently generating an alerting tone according to said first oscillatory signal, a second electronic switch circuit coupled to said second output of said decoder circuit and responsive to said second control signal to provide a second enabling signal, a second oscillator circuit coupled to said second electronic switch circuit and responsive to the presence of the second enabling signal to provide a second oscillatory signal, and a lamp coupled to the output of said second oscillator circuit and intermittently turned on thereby according to said second oscillatory signal.

9. The communication receiver set forth in claim 8, wherein said first electronic switch circuit includes timing means to provide said first enabling signal for a limited duration to render said first oscillator circuit operative for said limited duration, said second electronic switch circuit including latching means to cause said second enabling signal to exist indefinitely to render said second oscillator circuit operative indefinitely, said second electronic switch circuit further including reset means to interrupt said latching means and thus said second enabling signal.

10. The communication receiver set forth in claim 8, wherein each of said first and second oscillator circuits has a further input coupled to said pulser circuit to cause said speaker to produce an intermittent alerting tone and to cause said lamp to flash on and off.

11. The communication receiver set forth in claim 8, and further comprising a pulse extender coupled to said second electronic switch circuit and responsive to the termination of said control signals to cause said series of pulses to have an increased duration.

12. A communication receiver for receiving carrier signals modulated by at least one control tone, said receiver comprising a processing circuit for receiving the modulated carrier signals and detecting the control tone therein, a first pulser circuit coupled to said processing circuit and operative to produce a first series of pulses for intermittently rendering said processing circuit operative, a decoder circuit coupled to said processing circuit and responsive to the control tone for generating at the output thereof a control signal, said first pulser circuit having an input coupled to the output of said decoder circuit and responsive to the application thereto of said control signal to furnish a continuous supply voltage for said processing circuit for an interval substantially longer than the duration of each pulse in said first series of pulses, a second pulser circuit having an input coupled to the output of said decoder circuit and responsive to the control signal subsisting for more than a selected duration for producing a second series of pulses out of phase with said first series of pulses, means combining said first and second series of pulses to provide a third series of pulses of higher frequency than either of said first and second series, an electronic switch circuit coupled to the output of said decoder circuit and responsive to the control signal to provide an enabling signal, an oscillator circuit having a pair of inputs respectively coupled to said last mentioned means and to said switch circuit and responsive to the presence of the series of pulses applied thereto and the enabling signal to provide an oscillatory signal frequency dependent on the series of pulses applied thereto, an annunciator coupled to the output of said oscillator circuit and intermittently generating an alerting signal in accordance with said oscillatory signal.

13. The communication receiver set forth in claim 12, and further comprising a further electronic switch circuit having an input coupled to said decoder circuit and responsive to the control tone subsisting for said selected duration to provide a further enabling signal, said further electronic switch circuit including means for delaying production of said further enabling signal until said control signal has subsisted for longer than said selected duration, said second pulser circuit having a pair of inputs respectively coupled to the output of said further electronic switch circuit and to said first pulser circuit.

14. The communication receiver set forth in claim 12, wherein the duration of said control signal is related to the duration of said control tone.

15. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently rendering said processing circuit operative, a decoder circuit coupled to said processing circuit and responsive to the control tone for generating at the output thereof a control signal, said pulser circuit having an input coupled to the output of said decoder circuit and responsive to the application thereto of said control signal to furnish a continuous supply voltage for said processing circuit for [an] *a predetermined* interval substantially longer than the duration of each pulse in said series of pulses, a pulse extender coupled to said pulser circuit and responsive to the termination of said predetermined interval to cause said series of pulses to have an increased duration, an electronic switch circuit coupled to the output of said decoder circuit and responsive to the control signal to provide an enabling signal, an oscillator circuit having a pair of inputs respectively coupled to pulser circuit and said switch circuit and responsive to the enabling signal to provide an oscillatory signal during said pulses, and an annunciator coupled to the output of said oscillator circuit and intermittently generating an alerting signal in accordance with said oscillatory signal.

16. The communication receiver set forth in claim 15, wherein said pulse extender includes a reactance and electronic switch coupled in series, said switch being closed upon termination of said interval to coupled said reactance in said pulser circuit to increase the duration of the pulses generated thereby.

17. The communication receiver set forth in claim 15, wherein said pulse extender includes means to at least double the duration of each of said pulses in said series of pulses.

18. A communication receiver for receiving carrier signals modulated by a series of sequential control tones, said receiver comprising a processing circuit for receiving the modulated carrier signals and detecting the series of modulated control tones therein, a pulser circuit coupled to said processing circuit and operative to produce a series of pulses for intermittently rendering said processing circuit operative, and a decoder circuit including a pair of channels coupled to said processing circuit and alternately responsive to said series of control tones for generating at the output thereof a substantially continuous control signal terminating with the last control tone, said pulser circuit having an input coupled to the output of said decoder circuit and responsive to the application thereto of said control signal to furnish a continuous supply voltage for said processing circuit for an interval at least until the termination of the last control tone in the series of control tones.

19. A communication receiver for receiving carrier signals modulated by a series of control tones, said receiver comprising a processing circuit for receiving the modulated carrier signals and detecting the series of modulated control tones therein, a pulser circuit coupled to said processing circuit and operative to produce a series of pulses for intermittently rendering said processing circuit operative, a decoder circuit coupled to said processing circuit and responsive to the first control tone in said series of control tones for generating at a first output thereof a first control signal and responsive to a subsequent control tone for generating at a second output thereof a second control signal, said pulser circuit being coupled to said first output and responsive to the application thereto of said first control signal to furnish a continuous supply voltage for an interval substantially longer than the duration of each pulse in said series of pulses, an electronic switch circuit coupled to said second output of said decoder circuit and responsive to said second control signal to provide an enabling signal, a utilization circuit having an input coupled to said switch circuit and responsive to the enabling signal to provide an output signal, and an annunciator coupled to said utilization circuit for converting the output signal into usable form.

20. The communication receiver set forth in claim [14] *19* wherein said decoder circuit is responsive to the last control tone in said series of control tones for generating said second control signal.

21. The communication receiver set forth in claim [14] *19* wherein said second control signal terminates essentially at the same time that the last control tone in the series of control tones terminates.

22. A communication receiver for receiving carrier signals modulated by at least one control tone, said receiver comprising a processing circuit for receiving the modulated carrier signals and detecting the control tone therein, a pulser circuit coupled to said processing circuit and operative to produce a series of pulses for intermittently renderig said processing circuit operative, a decoder circuit coupled to said processing circuit and responsive to the control tone for generating at the output thereof a control signal, said pulser circuit having an input coupled to the output of said decoder circuit and responsive to the application thereto of said control signal to furnish a continuous supply voltage for said processing circuit for a predetermined interval substantially longer than the duration of each pulse in said series of pulses, an electronic switch circuit coupled to the output of said decoder circuit and responsive to the control signal to provide an enabling signal, said electronic switch circuit including *timing* means to cause said enabling signal to persist for a *predetermined limited* duration following termination of the control tone, a utilization circuit having an input coupled to said switch circuit and responsive to the enabling signal to provide an output signal, and an annunciator coupled to said utilization circuit for converting the output signal into usable form.

[23. The communication receiver set forth in claim 22, wherein said means is a latching device to cause an enabling signal to have an indefinite duration, said electronic switch circuit further including reset means to interrupt said latch and thus said enabling signal.]

[24. The communication receiver set forth in claim 22, wherein said means is a timer to cause the enabling signal to have a limited duration.]

25. The communication receiver set forth in claim [24] *22*, wherein said switch circuit includes a manually operable bypass switch to provide said enabling signal beyond the termination of said limited duration.

26. The communication receiver set forth in claim 22, wherein said utilization circuit includes an audio amplifier and said annunciator includes a speaker.

27. The communication receiver set forth in claim 22, wherein said utilization circuit includes an oscillator and said annunciator is a speaker.

28. The communication receiver set forth in claim 22, wherein said utilization circuit includes lamp control means and said annunciator is a lamp.

References Cited

The following references, cited by the Examiner, are of record in the patented file of this patent or the original patent.

UNITED STATES PATENTS

| | | | |
|---|---|---|---|
| 3,372,338 | 3/1968 | Kubota et al. | 325—492 |
| 2,912,574 | 11/1959 | Gengel | 325—492 |

FOREIGN PATENTS

| | | | |
|---|---|---|---|
| 1,038,517 | 8/1966 | England | 325—492 |
| 1,111,006 | 4/1968 | England | 325—492 |

ALBERT J. MAYER, Primary Examiner

U.S. Cl. X.R.

325—391, 392, 395, 478

UNITED STATES PATENT OFFICE
CERTIFICATE OF CORRECTION

Patent No. Re. 28,222 Dated November 5, 1974

Inventor(s) Keith H. Wycoff

It is certified that error appears in the above-identified patent and that said Letters Patent are hereby corrected as shown below:

Col. 1, line 45, after "control" there should be inserted -- tone or tones for generating at the output thereof a control --.
Col. 2, line 62, "the" should be deleted.
Col. 6, line 29, "The" should be -- This --.
Col. 7, line 22, "conductor" should be -- conductive --.
Col. 8, line 3, "potentionmeter" should be -- potentiometer --.
Col. 11, line 13, "circuit" should be -- circuits --.
Col. 13, line 12, "pulse" should be -- pulser --; line 57, "referenec" should be -- reference --.
Col. 14, line 64, before "rectified" should be inserted -- A --; line 74, "an", second occurrence, should be -- a --.
Col. 15, line 64, "and" should be -- the --; line 68, "on" should be -- of --.
Col. 16, line 45, "the", first occurrence, should be -- that --.
Col. 19, line 20, "altering" should be -- alerting --; line 23, "altering" should be -- alerting --; line 49, "altering" should be -- alerting --.
Col. 21, line 1, "pulse" should be -- pulser --.
Col. 22, line 54, "returned" should be -- retuned --.
Col. 25, line 29, "mited" should be -- mitted --.
Col. 27, line 21, after "predetermined" should be inserted -- limited --.
Col. 29, line 15, "coupled" should be -- couple --.

Signed and sealed this 7th day of January 1975.

(SEAL)
Attest:

McCOY M. GIBSON JR.
Attesting Officer

C. MARSHALL DANN
Commissioner of Patents

USCOMM-DC 60376-P69
* U.S. GOVERNMENT PRINTING OFFICE : 1969 O—366-334.